United States Patent
Takaki

(10) Patent No.: US 9,690,787 B2
(45) Date of Patent: Jun. 27, 2017

(54) CONTENTS MANAGEMENT SYSTEM, CONTENTS MANAGEMENT METHOD, AND COMPUTER PROGRAM

(75) Inventor: Goro Takaki, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 797 days.

(21) Appl. No.: 13/169,091

(22) Filed: Jun. 27, 2011

(65) Prior Publication Data

US 2011/0283234 A1    Nov. 17, 2011

Related U.S. Application Data

(63) Continuation of application No. 11/242,957, filed on Oct. 5, 2005, now abandoned.

(30) Foreign Application Priority Data

Oct. 7, 2004 (JP) .............................. P2004-295078

(51) Int. Cl.
*G06F 3/048* (2013.01)
*G06F 17/00* (2006.01)
(Continued)

(52) U.S. Cl.
CPC .. *G06F 17/30061* (2013.01); *G06F 17/30064* (2013.01); *G06F 17/3084* (2013.01); *G06F 17/30817* (2013.01); *G06F 17/30849* (2013.01)

(58) Field of Classification Search
CPC ..... H04L 29/0809; G06F 3/048; G06F 17/00; G06F 3/00
(Continued)

(56) References Cited

U.S. PATENT DOCUMENTS 6,085,205 A * 7/2000 Peairs ............... G06F 17/30716
707/E17.093
6,545,660 B1 * 4/2003 Shen ....................... G06F 3/048
345/156
(Continued)

FOREIGN PATENT DOCUMENTS

JP          8-44759          2/1996
JP          11-045261        2/1999
(Continued)

OTHER PUBLICATIONS

Decision to Refuse a European Patent Application issued by the European Patent Office on Dec. 13, 2011 in corresponding Application No. EP 0521825.4 (17 pages).
(Continued)

*Primary Examiner* — Jennifer To
*Assistant Examiner* — Hugo Molina
(74) *Attorney, Agent, or Firm* — Lerner, David, Littenberg, Krumholz & Mentlik, LLP

(57) ABSTRACT

A contents management system manages multiple contents stored in a plurality of apparatuses. The contents management system includes a command input unit that assigns a viewing style for guiding a user to desired contents and a contents search condition; a screen format generating unit that generates a screen format according to the assigned viewing style; a contents search unit that searches a contents providing space constituted by the plurality of apparatuses, each storing contents, according to the assigned search condition; and a contents presenting unit that displays and outputs information on the individual contents searched by the contents search unit on the screen format through mapping.

9 Claims, 25 Drawing Sheets

(51) Int. Cl.
*G06F 3/00* (2006.01)
*G06F 17/30* (2006.01)

(58) Field of Classification Search
USPC .......................................................... 715/738
See application file for complete search history.

(56) References Cited

U.S. PATENT DOCUMENTS

| | | | |
|---|---|---|---|
| 6,741,864 B2* | 5/2004 | Wilcock | G06F 17/30265 348/14.1 |
| 6,809,724 B1 | 10/2004 | Shiraishi et al. | |
| 7,317,449 B2 | 1/2008 | Robbins et al. | |
| 7,343,365 B2 | 3/2008 | Farnham et al. | |
| 7,398,479 B2* | 7/2008 | Hooper et al. | 715/838 |
| 7,787,042 B2* | 8/2010 | Nagata | 348/333.11 |
| 7,970,240 B1* | 6/2011 | Chao et al. | 382/305 |
| 2002/0048054 A1* | 4/2002 | Ohata | G06F 17/30274 358/500 |
| 2002/0095306 A1* | 7/2002 | Smith | G06Q 10/08 705/333 |
| 2003/0033296 A1* | 2/2003 | Rothmuller | G06F 17/30017 |
| 2003/0083533 A1 | 5/2003 | Gerba et al. | |
| 2003/0182170 A1 | 9/2003 | Meunitz | |
| 2003/0200192 A1* | 10/2003 | Bell | G06F 17/3087 |
| 2004/0078389 A1 | 4/2004 | Hamilton | |
| 2004/0125150 A1* | 7/2004 | Adcock | G06Q 10/109 715/810 |
| 2005/0039142 A1* | 2/2005 | Jalon | G06Q 10/109 715/823 |
| 2005/0289133 A1* | 12/2005 | Arrouye et al. | 707/4 |
| 2008/0222170 A1 | 9/2008 | Farnham et al. | |

FOREIGN PATENT DOCUMENTS

| | | |
|---|---|---|
| JP | 11-224148 | 8/1999 |
| JP | 2000-075294 | 3/2000 |
| JP | 2000-357038 | 12/2000 |
| JP | 2001-229180 | 8/2001 |
| JP | 2002-148682 | 5/2002 |
| JP | 2002149682 A | 5/2002 |
| JP | 2003-228587 | 8/2003 |
| WO | WO 02/057959 | 7/2002 |

OTHER PUBLICATIONS

Shen, Chia et al.; Personal Digital Historian: Story Sharing Around the Table, Interaction Magazine, Mar./Apr. 2003 (8 pages).

Schneiderman; "Designing the User Interface: Strategies for Effective Human-Computer Interaction;" Designing the User Interface; Strategies for Effective Human Computer Interaction, Reading; Addison esley; US; 1992; pp. 519-521, 526; XP002210867.

Suzuki, Keny et al.; Bookware: A Multi-Media Handling System with Book and BookShelf Metaphor, Information Processing Society of Japan memoir; Japan; Information Processing Society of Japan; May 16, 1997; vol. 97, No. 43; pp. 67-72. Abstract.

Notification of Reasons for Refusal from Japanese Patent Office for Japanese Patent Application No. 2004-295078, dated May 14, 2009; 3 pages, with English translation, 3 pages.

Summons to Attend Oral Proceedings issued Jan. 4, 2011 in corresponding European Patent Application No. EP 05021825.4 (10 pages).

* cited by examiner

TOOL BAR REGION    VIEW REGION

CONTENTS MANAGEMENT SYSTEM, CONTENTS MANAGEMENT METHOD, AND COMPUTER PROGRAM

This is a continuation of U.S. application Ser. No. 11/242,957, filed Oct. 5, 2005 now abandoned, and claims the benefit of Japanese Patent Application No. JP 2004-295078, filed Oct. 7, 2004, both of which are incorporated herein by reference.

CROSS REFERENCES TO RELATED APPLICATIONS

The present invention contains subject matter related to Japanese Patent Application. JP 2004-295078 filed in the Japanese Patent Office on Oct. 7, 2004, the entire contents of which being incorporated herein by reference.

BACKGROUND OF THE INVENTION

1. Field of the Invention

The invention relates to a contents management system which suitably manages various media kinds of digitalized contents, to a contents management method, and to a computer program. More particularly, the invention relates to a contents management system which suitably manages enormous scattered contents, to a contents management method, and to a computer program.

Specifically, the invention relates to a contents management system which suitably manages contents scattered and stored in various apparatuses such that desired contents is easily searched from the contents, to a contents management method, and to a computer program. More particularly, the invention relates to a contents management system which provides a user with a clue or guide for allowing the user to reach desired contents under a computing circumstance in which various media kinds of contents exist, to a contents management method, and to a computer program.

2. Description of Related Art

In recent days, with the rapid progress in an information technology (IT) field, various computer systems have been developed and manufactured, and have been come into use in a university or other research institutes, an office of a company, and a home. On a computer, in addition to a document file of a text format, various kinds of media, such as sound, images, natural languages, and the like, are digitalized and mathematically handled, such that a high-speed processing, such as edition/processing, storage, management, communication, and sharing of information, can be performed. As such, on the computer system, various media kinds of contents can be handled.

Further, in recent years, an information communication network from a private-network, such as a domestic LAN or the like, to a wide area network, such as Internet or the like, is set up. For example, to the domestic LAN, all apparatuses, such as a camcorder, a digital camera, a TV receiver, a DVD player, an HD recorder, and the like, in addition to a PC or a PDA, are connected, and these apparatuses can store generated or acquired contents, share them with one another, and utilize the contents by reproduction or the like. In addition, a user can obtain desired contents from a remote contents server. In summary, in a network in which all apparatuses are connected, various media kinds of enormous contents can be used.

A computing circumstance in which various media kinds of enormous contents can be handled seems to be convenient seemingly. However, how to manage enormous contents is problematic. In an extreme case, astronomical numbers of contents are scattered on a global scale, and thus it may be difficult for a user to reach desired contents. Accordingly, the user loses track of the desired contents.

At present time, on a desktop screen in which a graphical user interface (GUI) is provided, various resource objects are displayed with icons, and thus it is convenient in that various resource objects can be handled by an intuitive input operation. However, these icons do not provide the clue or guide for allowing the user to reach the desired contents. As a result, the user may not effectively utilize available contents, and the contents may be stored away.

For example, an information search system has been suggested in which a search navigation is provided to correctly feedback which portion of stored information corresponds to information represented on the system by a searcher (for example, see Japanese Patent Laid-Open No. 8-44759). In the information search system, stored information is divided by individual fixed viewpoints, and a view for displaying each element is prepared for each viewpoint. The views dynamically change in connection with one another in response to the numbers of search result and a view selection processing of the user in course of search. Further, for the collection of information limited by the searcher, the feedback of information searched by applying the previous view is performed, and a new limitation condition is given. The feedback becomes a clue for finding out a limitation condition, which is not intended at first, and thus the searcher, who does not have expert knowledge in the technical field, is helped to find out a desired main subject in accordance with a keyword given in generous examination.

However, in the information search system, for the user, who does not have a guide on search, for example, which media kind of contents is available, the clue or guide for finding out the desired contents from a massive contents storage space may not be provided.

Further, a contents search apparatus has been suggested in which a keyword is automatically extracted by performing sound recognition or image recognition on input information, such as sound information or image information, so as to efficiently search desired contents (for example, see Japanese Patent Laid-Open No. 2001-229180). In the contents search apparatus, for example, the keyword is acquired through the sound recognition of the input sound information, the keyword is compared with a keyword, which is stored and managed in correlation with contents in a keyword-contents correlation table, and the contents corresponding to the keyword of the sound recognition result is outputted as the search result.

However, in the contents search apparatus, the keyword search is basic, and thus the user, who does not have the guide on search (that is, does not even have a technique for assigning the keyword) may not be provided with the clue or guide for finding out the desired contents from the massive contents storage space. Further, in the contents search apparatus, it is assumed that the keyword of the contents to be searched is registered in the keyword-contents correlation table. It may be impossible to perform a keyword registration processing on all the contents, which are scattered in the massive contents storage space, and thus the application range is restricted.

SUMMARY OF THE INVENTION

It is desirable to provide a contents management system which can suitably manage enormous scattered contents, a contents management method, and a computer program.

Further, it is desirable to provide a contents management system which can provide a user with a clue or visual guide for allowing the user to reach desired contents under a computing circumstance in which various media kinds of contents exist, a contents management method, and a computer program.

According to a first aspect of the invention, there is provided a contents management system which manages multiple contents stored in a plurality of apparatuses. The contents management system includes a command input unit that assigns a viewing style for guiding a user to desired contents and a contents search condition, a screen format generating unit that generates a screen format according to the assigned viewing style, a contents search unit that searches a contents providing space constituted by the plurality of apparatuses, each storing contents, according to the assigned search condition, and a contents presenting unit that displays and outputs information on the individual contents searched by the contents search unit on the screen format through mapping.

The 'system' described herein means the logical collection of the plurality of apparatuses (or functional modules for implementing specified functions), regardless of whether or not the individual devices or functional modules are incorporated in a single case.

An information communication network from a private network, such as a domestic LAN or the like, to a wide area network, such as Internet or the like, is set up, and various media kinds of enormous contents are used. In such a case, a user, who does not have a guide on search, for example, which media kind of contents is available, needs to be provided with a clue or guide for finding out desired contents from a massive contents storage space.

The inventors have considered that optimal viewing styles for the individual contents exist. Therefore, in the invention, a contents management system is provided in which easily viewable viewing styles can be obtained in accordance to the contents attribute, without performing a presentation restricted by a place of the contents, unlike a related art directory structure.

For example, if the viewing style for guiding to the desired contents with 5W1H as the clue is assigned with the command input unit, the screen format generating unit generates the screen format for arranging the individual contents according to 5W1H in response to the assignment of the viewing style. Then, when a browse request of the contents is received from a user, an available contents providing space is searched according to thinking of the user, the media kind, or other search conditions inputted by the user, and representative frames of the individual founded contents are mapped on a format corresponding to the attribute assigned by the user, such that it becomes easy for the user to find out the desired contents. When a person performs context analysis or the like, 5W1H is used as the clue. Therefore, if the contents are mapped on the screen format on the basis of 5W1H, it can be expected that it becomes easy for the user to find out the desired contents.

For example, a calendar view is a viewing style in which the contents are divided and arranged in a format of a table in which days of one month are arranged by seven dates to be presented, and, in each column, an icon of the contents in association with the corresponding date is arranged. The associated date is, for example, the date on which the contents is produced, edited, updated, or copied. Further, as the icon of the contents, for example, the representative frame extracted from motion picture contents or a jacket of a DVD title can be used. According to the calendar view, the user can easily reach the desired contents, in particular, with the attribute of "When" of 5W1H as the clue.

Further, as another example of the screen format for mapping the contents, a map view is used. The map view is a viewing style in which the contents are divided and arranged according to geographical information, such as a world map, a Japan map, or the like, to be presented, and the individual contents are mapped at associated places on the map or its peripheries. The associated place is a place at which the contents is produced, edited, updated, or copied or a place for representing (concerning) the details of the contents. Further, as the icon of the contents, for example, the representative frame extracted from the motion picture contents or a jacket of a DVD title can be used. According to the map view, the user can easily reach the desired contents, in particular, with the attribute of "Where" of 5W1H as the clue.

The calendar view or the map view handles "When" or "Where" of 5W1H as the attribute of the contents, and provides the valid clue or guide, in which the contents view visually using information, such as the date or the place, is presented, for allowing the user to find out the desired contents. In this case, however, there is a problem in that a dead space on the screen is widened. Therefore, a matrix view in which the icons of the contents are orderly arranged on a screen in a lattice shape is prepared as one of the viewing styles. According to the matrix view, a larger number of icons can be presented on the screen, and the dead space on the screen can be narrowed. For example, when a large number of still pictures are managed, the matrix view is directed to present the contents to be easily searched only with display of thumbnails.

Further, like a movie, there is a case in which attribute information, such as a contents title or the like, is used instead of 5W1H as the clue for finding out the contents by the user. A list view has a list-type view style in which the contents titles, as well as the representative frame, are introduced together.

If the list is selected on a view style selection menu, and the motion picture is selected as the media kind, the list view for the motion picture contents extracted on the contents providing space is presented. For example, banners are correspondingly provided for the motion picture contents, and, in each banner, the representative frame, the title, the date of the motion picture contents, and the like are displayed. Further, in case of a new movie, a mark of "New" is attached so as to call a user's attention.

In the calendar view or the map view, for the user who searches the contents, the valid clue or guide for finding out the desired contents can be provided on the basis of 5W1H. On the other hand, according to the user who ends contents search working, the search condition used for the contents search up to now can be used as the valid clue or guide at the time of the subsequent contents search.

Therefore, a shelf view is further prepared, and the shelf view is a viewing style in which the search condition assigned by the user is allocated for each shelf. That is, in each shelf, a metaphor is used that a group of contents extracted from the contents providing space on the basis of the search condition are stored and are drawn out from the shelf. Each shelf has reference information for the contents extracted on the basis of the registered search condition (that is, virtually stored in the shelf). Further, whenever the shelf opens, the search of the contents providing space is performed according to the search condition, and thus the reference information for the contents is updated.

Further, according to a second aspect of the invention, there is provided a computer program which is described in a computer readable format to cause a computer system to execute a processing for managing multiple contents stored in a plurality of apparatuses. The computer program includes inputting a common for assigning a viewing style for guiding a user to desired contents and a contents search condition, generating a screen format according to the assigned viewing style, searching a contents providing space constituted by the plurality of apparatuses, each storing contents, according to the assigned search condition, and displaying and outputting information on the individual contents searched in the searching the contents on the screen format through mapping.

The computer program according to the second aspect of the invention is defined as a computer program which is described in a computer readable format so as to implement a predetermined processing on a computer system. Specifically, by installing the computer program according to the second aspect of the invention in the computer system, a cooperative operation is exhibited on the computer system, and thus the same advantages as those in the contents management system according to the first aspect of the invention can be obtained.

According to the aspects of the invention, a contents management system which can suitably manage enormous scattered contents, a contents management method, and a computer program can be provided.

Further, according to the aspects of the invention, a contents management system which can provide a user with a clue or visual guide for allowing the user to reach desired contents under a computing circumstance in which various media kinds of contents exist, a contents management method, and a computer program can be provided.

Other effects, features, and advantages of the invention will be apparent from the detailed description by way of embodiments of the invention to be described below or the accompanying drawings.

BRIEF DESCRIPTION OF THE DRAWINGS

FIG. 18 is a diagram showing an example of a screen configuration of a list view, which introduces motion picture contents, such as a movie and the like;

DETAILED DESCRIPTION OF PREFERRED EMBODIMENTS

Figure 1:
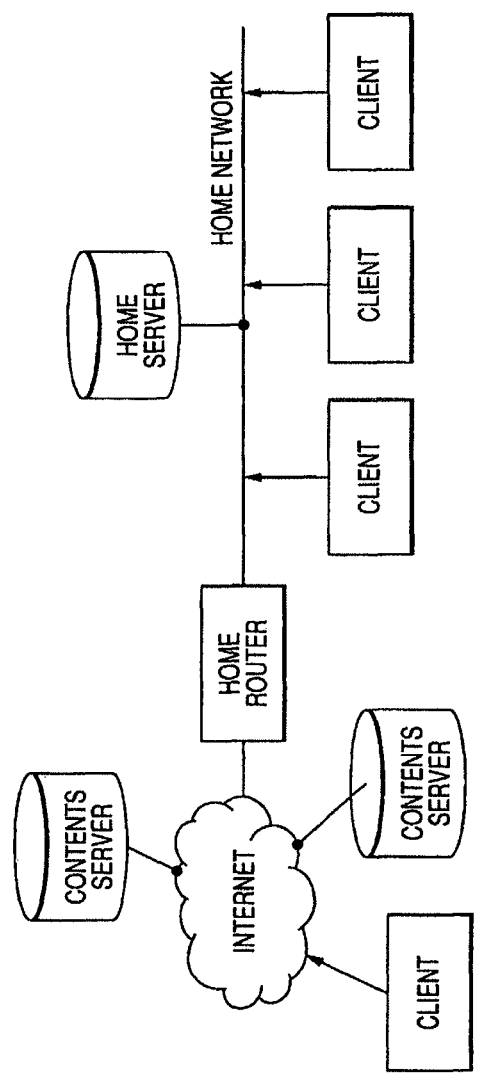
FIG. 1 is a diagram schematically showing a configuration of a network in which contents is utilized.

Hereinafter, an embodiment of the invention will be described in detail with reference to the drawings.

A. Outline

With the progress of the information technology, an information communication network from a private network, such as a domestic LAN or the like, to a wide area network, such as Internet or the like, is setup. For example, to the domestic LAN, all apparatuses, such as a camcorder, a digital camera, a TV receiver, a DVD player, an HD recorder, and the like, in addition to a PC or a PDA, are connected, and these apparatuses can store generated or acquired contents, share them with one another, and utilize the contents by reproduction or the like. Further, a user can acquire desired contents from a remote contents server.

In the network to which all apparatuses are connected, various media kinds of enormous contents are available, but, in order to effectively utilize the contents, how to manage enormous contents is problematic. A contents management system according to an embodiment of the invention provides a user with a clue or visual guide for allowing the user to reach the desired contents and helps the contents to be effectively utilized.

In the related art, the contents management is generally performed with a hierarchy structure using a directory. When a directory structure in which a contents management method or a management policy is reflected is logically constructed, on a browse screen, such as a so-called 'Explorer' or the like, the contents, which share the attribute, are arranged below one directory, and thus the user can easily find out the desired contents. However, in the directory structure, a logical storage space of a directory is formed for each physical storage space of a disk drive, and thus display depends on the physical arrangement. Unlike a closed system in which all available contents are stored in a signal local disk, in a system in which a remote disk is transmissively connected to a local disk, when all available contents on the domestic LAN or Internet are to be viewed, a plurality of associated contents are divided for each disk (that is, extend over the directories) to be displayed. Accordingly, it is difficult to search the desired contents. That is, it may be impossible to allow a large number of contents scattered among a plurality of physical storage spaces to be viewed simultaneously.

The inventors have considered that optimal viewing styles for the individual contents exist. In the embodiment of the invention, all the available contents on the domestic LAN or the wide area network, such as Internet or the like are to be viewed, but an easily viewable viewing style is obtained in accordance with the contents attribute, without performing presentation restricted by a place of the contents, unlike the directory structure in the related art. That is, in the embodiment of the invention, a large number of contents scattered in a plurality of physical storage spaces are simultaneously to be viewed.

Specifically, a screen format, in which the contents are arranged in accordance with the media kind or the attribute, such as 5W1H or the like, to be easily viewed, is prepared. Then, if a browse request of the contents is received from a user, the available contents providing spaces are searched according to thinking of the user, the media kind, or other search conditions inputted by the user, and the representative frames of the individual founded contents are mapped on a format corresponding to the attribute assigned by the user, such that it becomes easy for the user to find out the desired contents.

The contents attribute generally includes the contents title; a file type (format) or the media kind, the date, the abstract of the contents, and the like, but, in the present embodiment, 5W1H associated with the contents is further handled as the attribute. When a person performs context analysis or the like, 5W1H is used as the clue. In this case, if the contents are mapped on the screen format on the basis of 5W1H, it can be further expected that the user easily finds out the desired contents.

Here, as an example of the screen format for mapping the contents, a calendar view is used. The calendar view is a viewing style in which the contents are divided and arranged in a format of a table in which days of one month are arranged by seven dates to be presented, and, in each column, the icon of the contents in association with the corresponding date is arranged. The associated date is, for example, the date on which the contents is produced, edited, updated, or copied. Further, as the icon of the contents, for example, the representative frame extracted from motion picture contents or a jacket of a DVD title can be used. According to the calendar view, the user can easily reach the desired contents, in particular, with the attribute of "When" of 5W1H as the clue.

Further, as another example of the screen format for mapping the contents, a map view is used. The map view is a viewing style in which the contents are divided and arranged according to geographical information, such as a world map, a Japan map, or the like, to be presented, and the individual contents are mapped at associated places on the map or its periphery. The associated place is a place at which the contents is produced, edited, updated, or copied or a place for representing (concerning) the details of the contents. Further, as the icon of the contents, for example, the representative frame extracted from motion picture contents or a jacket of a DVD title can be used. According to the map view, the user can easily reach the desired contents, in particular, with the attribute of "Where" of 5W1H as the clue.

The screen configuration or the operation of the calendar view or the map view will be described in detail herein below.

B. System Configuration

FIG. 1 schematically shows the configuration of a network in which the contents is utilized. On a home network, a home server, and one or more client terminals exist. The home network is connected to an external network, such as Internet or the like, through a home router.

The client on the home network includes a PC or a PDA, a camcorder, a digital camera, a TV receiver, a DVD recorder, an HD recorder, and the like, and generates or creates, reproduces, browses, or manages the contents.

The home server correctly acquires the contents from the contents server on the external network via the home router, stores the contents, and distributes the contents in the home. Of course, the home server can acquire the contents by use of a unit, such as a package media or broadcast reception, other than the network.

The individual client terminals request the home server for the desired contents, and acquire and use the desired contents. Further, among the clients, such as the PC, the camcorder, the digital camera, the TV receiver, and the like, the individual clients communicate the contents to be generated/created and received with other clients via the home server or directly.

The client terminal can utilize the contents to be provided on the home network or the contents to be provided by the contents server on the external network connected to the client terminal via the router. According to the contents management of the present embodiment, a view screen of the contents is presented on the basis of the attribute of the contents, such as 5W1H or the like, regardless of the actual place of a contents entity. Therefore, even when a user performs the contents search with no guide, the user easily finds out interesting contents from a massive contents providing space.

Figure 2:
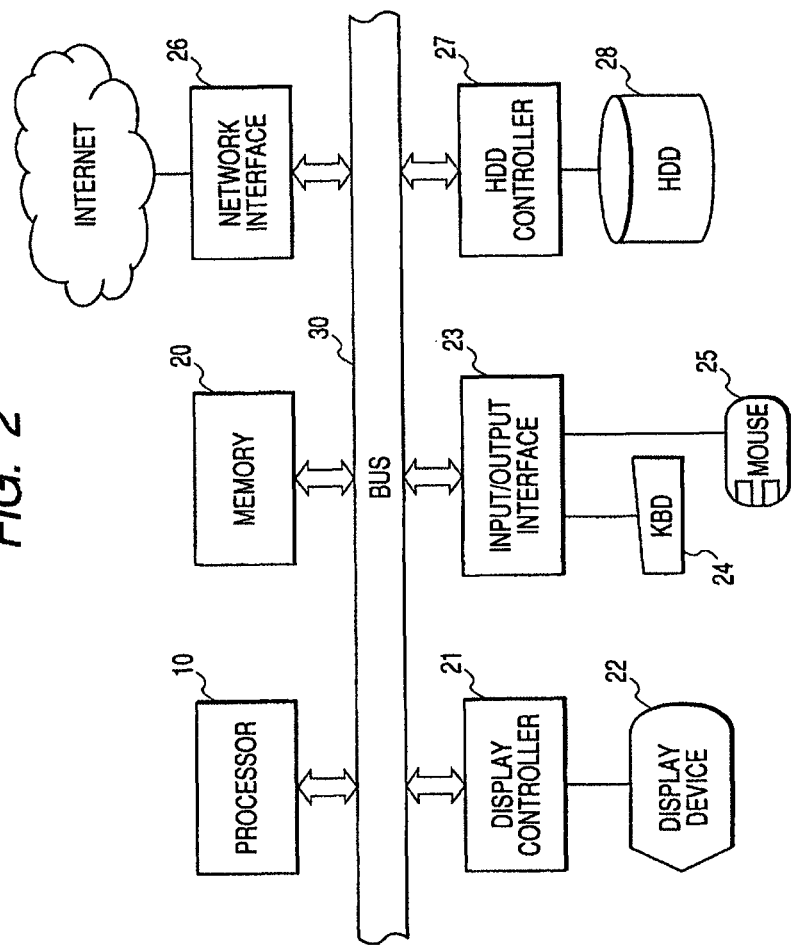
FIG. 2 is a diagram schematically showing a hardware configuration of a system, for implementing the contents management.

FIG. 2 schematically shows the hardware configuration of a system for realizing the contents management. The contents management system is implemented to start a predetermined contents management application on a computer system, such as the PC or the PDA, on which the user views the contents.

The system shown in FIG. 2 primarily has a processor 10. The processor 10 executes various processes on the basis of a program stored in a memory under a program execution circumstance to be provided by an operating system (OS). Further, the processor 10 controls various peripheral circuits, which are connected thereto via an external bus/interface 14 and a bus 30. The peripheral circuits connected to the bus 30 are as follows.

A memory 20 has a semiconductor memory, such as a DRAM (Dynamic RAM) or the like, and is used to load program codes to be executed by the processor 10 or to temporarily store job data of an execution program. The memory 20 constitutes a memory space of the processor 10. In the present embodiment, the processor 10 loads and executes the predetermined contents management application on the memory 20. In addition, the processor 10 stores job data relating to the content management on the memory 20.

A display controller 21 generates a display image according to an instruction to draw to be transmitted from the processor 10 and transmits the generated display image to a display device 22. The display device 22 connected to the display controller 21 displays and outputs the image on a screen according to display image information transmitted from the display controller 21.

An input/output interface 23, to which a keyboard 24 or a mouse 25 is connected, transmits an input signal from a user input device, such as the keyboard 24 or the mouse 25, to the processor 10. Further, when the system is a tablet computer or a PDA with a touch panel, as the user input device, a touch sensor (not shown) overlapping the display screen of the display device 22, instead of the keyboard 24 or the mouse 25, may be used.

The input/output interface 23 has a universal interface, such as a USB (Universal Serial Bus), through which various information apparatuses can be connected to the computer system shown in FIG. 2.

To a hard disk device (HDD: Hard Disk Drive) controller 27, a large-volume external storage device 28, such as a HDD or the like, is connected. The HDD controller 27 controls data input/output to/from the HDD 28 connected thereto. In the HDD 28, a program of the operating system (OS) to be executed by the processor, application programs, driver programs, and data or contents, which are subjected to a process, such as reference or reproduction, by the programs, are stored. The individual programs are installed in an executable format on the HDD 28. The HDD 28 corresponds to a local disk, and the contents stored in the HDD 28 are under management of the corresponding contents management system.

A network interface 26 is connected to the external network, such as a LAN (Local Area Network) or Internet, so as to control data communication through Internet. That is, the network interface 26 transmits data transmitted from the processor 10 to other devices on Internet, and simultaneously receives data transmitted through Internet and delivers received data to the processor 10. For example, the network interface 26 can receive the program or data from the outside through the network. In the present embodiment, on the external network, the contents servers, which provide the contents with charge or free of charge, are scattered. The contents servers serve as remote disks, and the contents stored therein are under management of the corresponding contents management system.

Moreover, in order to constitute an information processing device, such as a personal computer or the like, various electrical circuits need to be provided, in addition to the circuits shown in FIG. 2. However, since these circuits are well-known for the skilled ordinary person, and do not constitute the subject matter of the invention, the descriptions thereof will be omitted in the present specification. Further, it should be understood that, in order to prevent the drawings from being complicated, only a part of the connection among the individual hardware blocks in the drawings is shown.

Figure 3:
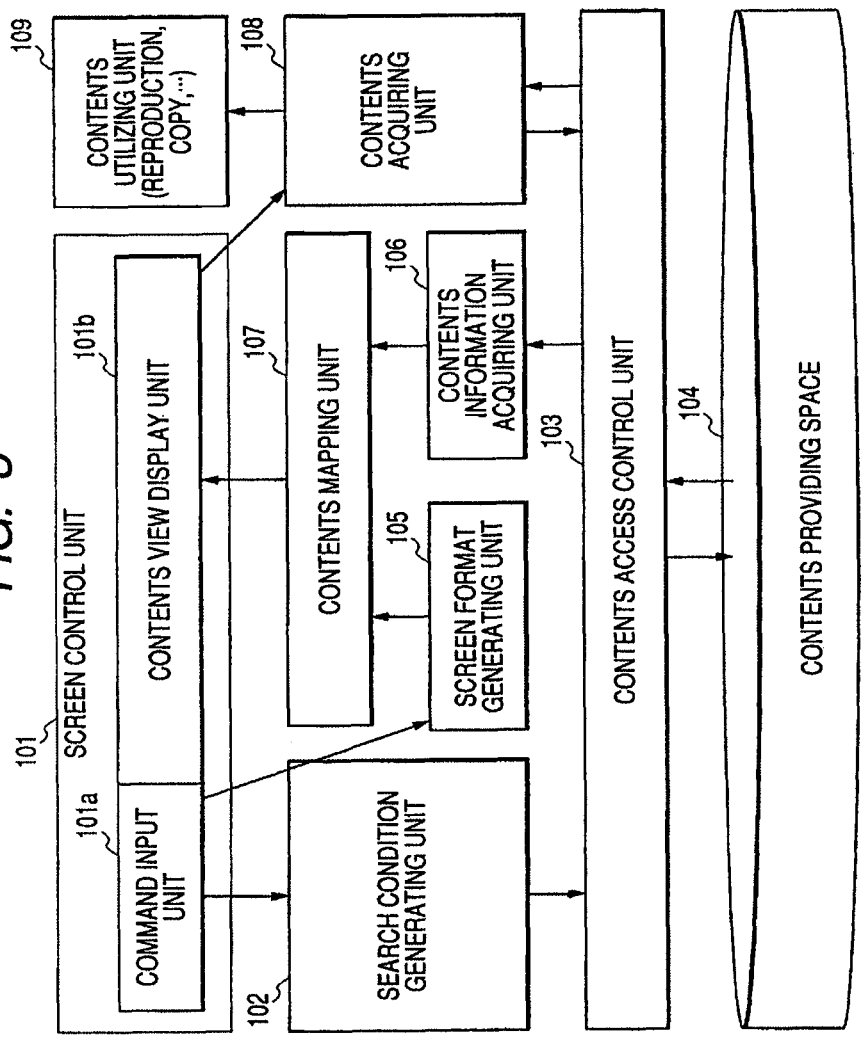
FIG. 3 is a diagram showing a functional configuration of a contents management system according to an embodiment of the invention.

FIG. 3 shows the functional configuration of the contents management system according to the present embodiment.

A screen control unit 101 is a functional module that controls the display content on the screen of the display device 22, and corresponds to, for example, a window manager of the operating system. In the present embodiment, the screen control unit 101 has a command input unit 101a, such as a tool bar (described below), to which an instruction from the user is inputted, and a contents view display unit 101b that display a contents browse screen of a view style serving as a clue or guide for allowing the user to find out the desired contents.

A search condition generating unit 102 generates a search condition for extracting (filtering) the contents from a massive contents providing space on the basis of a media kind of the contents or others contents attributes inputted via the command input unit 101a.

A contents access control unit 103 is a functional module that controls an access operation to the massive contents providing space 104 having the local disks or remote disks, and corresponds to, for example, a file manager of the operating system. The contents access control unit 103 reads out the contents from the corresponding disk in response to a contents request with assigned path name and file name, and searches the contents providing space 104 according to the search condition generated by the search condition generating unit 102.

A screen format generating unit 105 generates a screen format that has the view style, such as a calendar view or a map view (described above), assigned by the user via the command input unit 101a.

A contents information acquiring unit 106 acquires information on various contents extracted as the search result of the contents providing space 104 according to the search condition generated by the search condition generating unit 102.

A contents mapping unit 107 maps the information of the individual contents extracted through the search of the contents providing space 104 on the corresponding places of the screen format generated by the screen format generating unit 105. Then, the view style screen with the contents information mapped thereon is displayed on the screen by the contents view display unit 101b as the clue or guide for allowing the user to find out the desired contents.

The user can look for the contents through the contents view display, and specify the desired contents. A contents acquiring unit 108 reads out the assigned contents from the contents providing space 104 through the contents access control unit 103, and delivers the read contents to a contents utilizing unit 109. The contents utilizing unit 109 utilizes the contents acquired by the contents acquiring unit 108, for example, reproduces the media contents, such as motion pictures or sound, copies the contents, or the like.

C. Contents View

The contents management system according to the invention presents the contents view screen, which serves as the clue or guide for allowing the user to reach the desired contents, so as to help the user to effectively utilize the contents.

Figure 4:
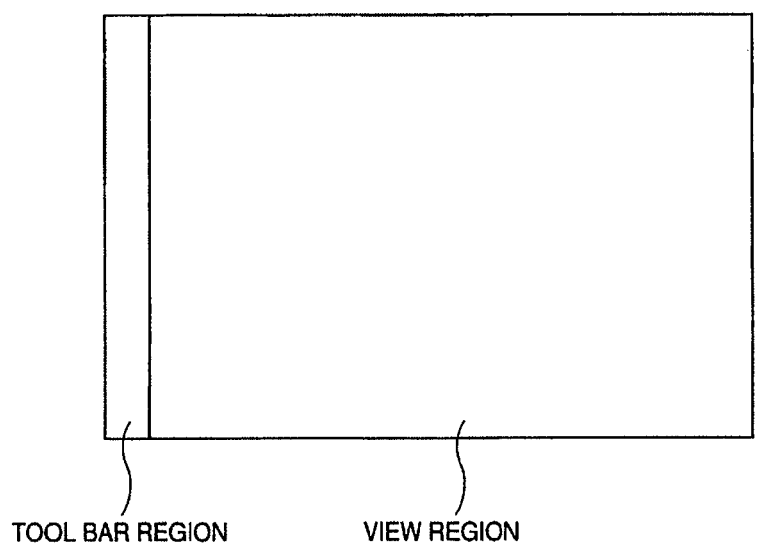
FIG. 4 is a diagram schematically showing a basic configuration of a contents view screen according to an embodiment of the invention.

FIG. 4 schematically shows the basic configuration of the contents view screen according to the present embodiment. As shown in FIG. 4, the contents view screen has a tool bar region and a view region.

The tool bar region corresponds to the above-described command input unit 101a, and assigns the view style in the view region, the contents attribute, such as the media kind or the like, as the search condition.

Further, the view region corresponds to the above-described contents view display unit 101b, in which the information of the individual contents extracted through the search of the contents providing space 104 is mapped on the corresponding places of the screen format generated by the screen format generating unit 105. Then, the screen with the contents information mapped thereon is an optimal viewing style for the contents and serves as the valid clue or guide for allowing the user to find out the desired contents. The user can directly operate the contents mapped on the view region through the screen on which the view is presented.

In an example shown in FIG. 4, the tool bar is provided along the left edge of the screen. For example, when the contents management system includes a touch panel-type tablet computer, the user operates individual buttons on the tool bar by use of a finger of the left hand holding a computer main body, thereby instructing the individual contents on the view region by a fingertip of the right hand.

C-1. Tool Bar

Figure 5:
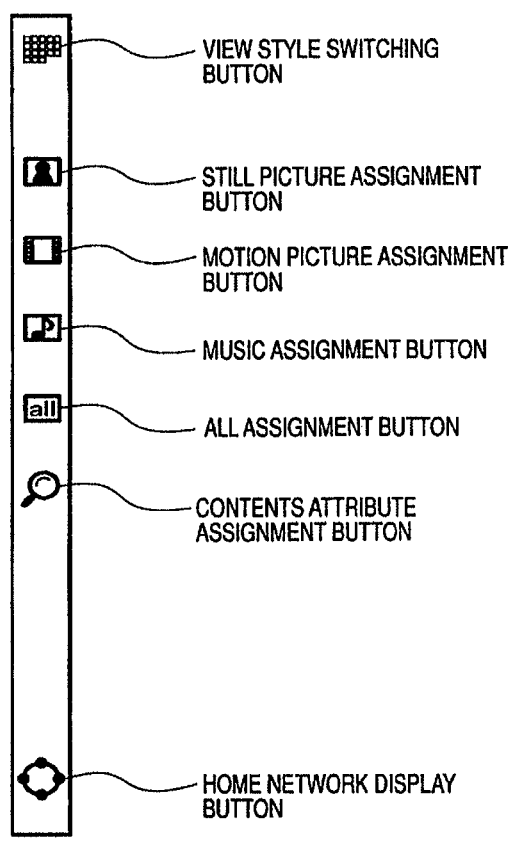
FIG. 5 is a diagram showing an example of a configuration of a tool bar.

On the tool bar, the view style in the view region, the contents attribute, such as the media kind or the like, as the search condition, and the like are assigned. FIG. 5 shows an example of the configuration of the tool bar.

Figure 6:
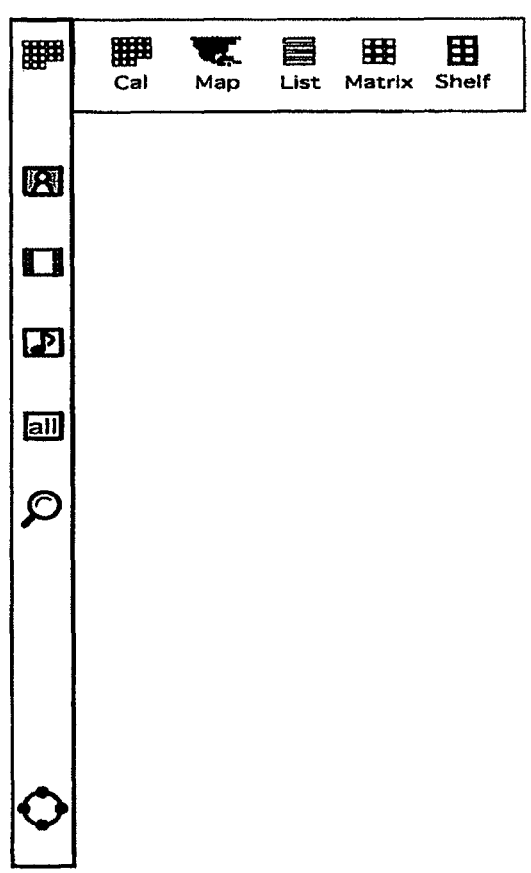
FIG. 6 is a diagram showing an example of a configuration of a view style selection menu.

A button on the top of the tool bar is a view style switching button, which is used to assign the screen format in the view region. In the present embodiment, as the screen format serving as the optimal viewing style for the contents, 'calendar view', 'map view', 'list view', 'matrix view', 'shelf view', and the like are prepared. As shown in FIG. 6, if the view style button is pressed, a menu bar (hereinafter, referred to as 'view style selection menu') for selecting the individual view styles appears, thereby selecting a desired view style. The configuration or operation of each screen format will be described below in detail.

A group of buttons in the toolbar other than the button on the top of the tool bar are used to assign the contents attribute serving as the search condition at the time of searching the contents providing space. The second to fourth buttons area still picture assignment button, a motion picture assignment button, and a music assignment button for specifying the media kind such as still pictures, motion pictures, and music, respectively. Further, the fifth button is used when all the contents are assigned as the search target, without limiting the media kind.

Further, the sixth button in a shape of a magnifying glass is used to assign the contents attribute through a keyword or character input. If this button is pressed, the contents title, a dialog (not shown) for assigning the file type, the date, the place, the abstract of the contents, and the like opens.

The lowermost button of the tool bar is a button for instructing to display the home network. As described above with reference to FIG. 1, on the home network, in addition to the home server, which collectively performs a contents providing service, unspecified apparatuses, such as the PC or PDA, the camcorder, the digital camera, the TV receiver, the DVD player, and the HD recorder, and the like, are connected. The apparatuses on the home network may operate as the remote disks constituting the contents providing space or target devices for reproducing or copying the contents according to the contents management system. When the home network display button is pressed, all the apparatuses on the home network are visualized, thereby assigning as the storage places of the contents or the target devices through the screen. Display of the home network will be described below in detail.

C-2. Calendar View

The calendar view is the viewing style in which the contents are divided and arranged in a format of a table in which days of one month are arranged by seven dates to be presented, and, in each column, an icon of the contents in association with the corresponding date is arranged. The associated date is, for example, the date on which the contents is produced, edited, updated, or copied. Further, as the icon of the contents, for example, the representative frame extracted from motion picture contents or a jacket of a DVD title can be used. According to the calendar view, the user can easily reach the desired contents, in particular, with the attribute of "When" of 5W1H as the clue.

Figure 7:
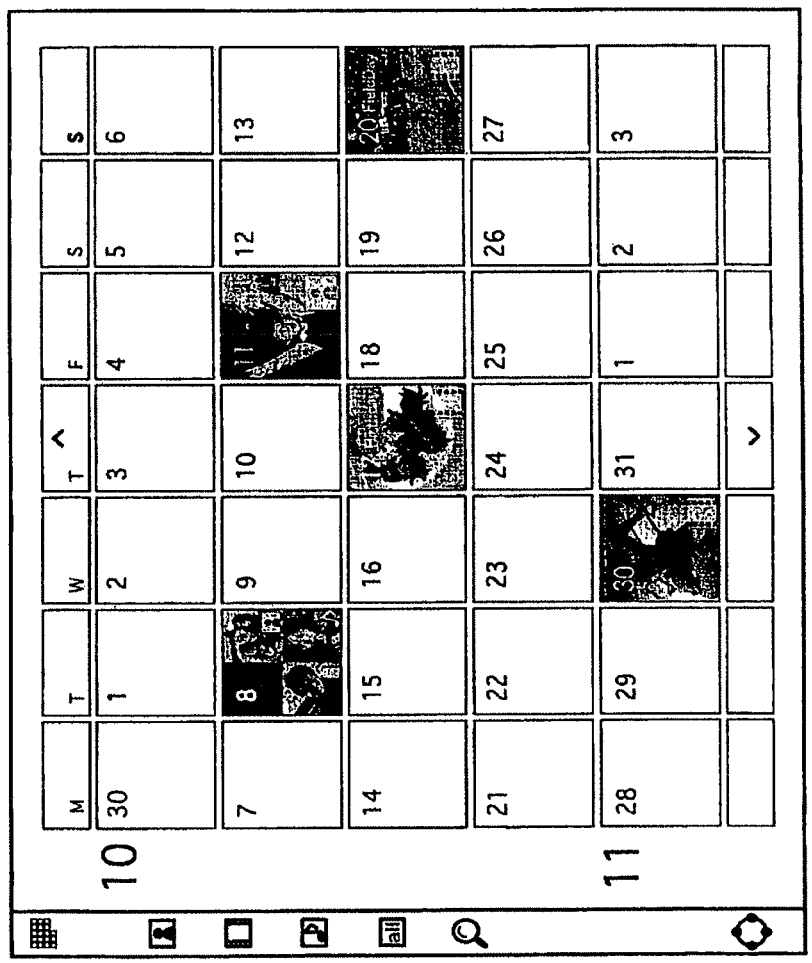
FIG. 7 is a diagram showing an example of a configuration of a contents view screen in which a calendar view is selected as a screen format.

FIG. 7 shows an example of the configuration of the contents view screen in which the calendar view is selected as the screen format. As shown in FIG. 7, the calendar view is in a format of a table in which days of one month are arranged by seven dates.

In each data column, the icon of the contents in association with the corresponding date is disposed. As the icon of the contents, for example, the representative frame extracted from the motion picture contents or the jacket of the DVD title can be used. Further, to the icon of the contents, a mark for representing the media kind (motion picture, still picture, music) of the corresponding contents is attached.

For example, like October 8, when two or more contents are associated on the same date, in the date column, the icons of all the corresponding contents are allocated to be arranged.

Figure 8:
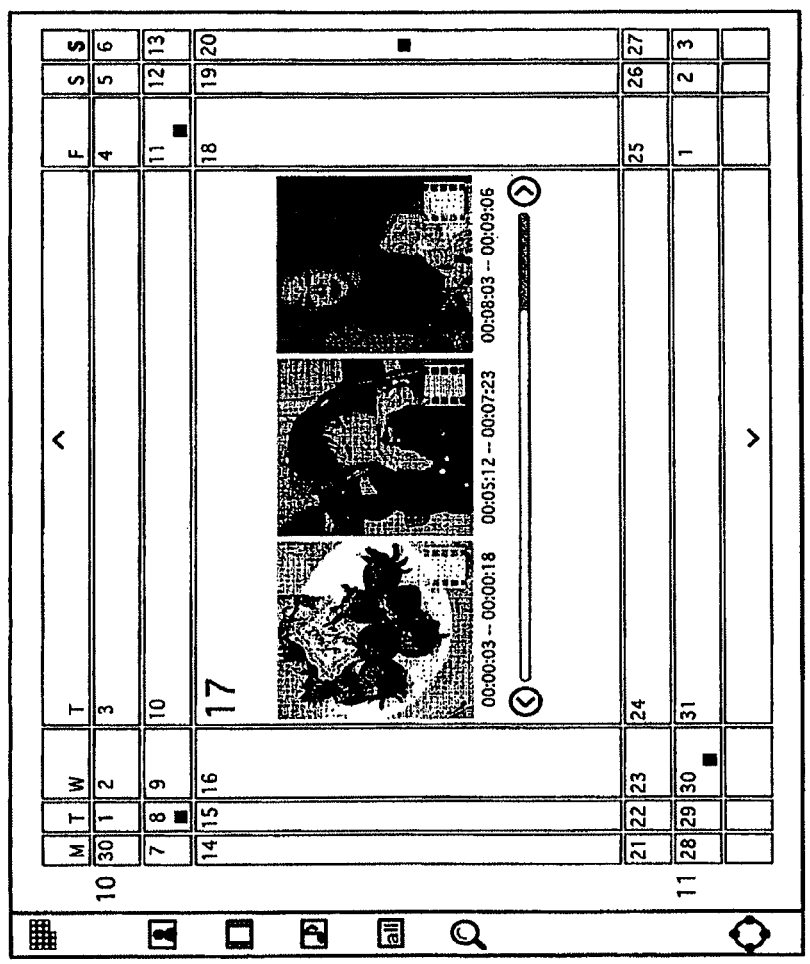
FIG. 8 is a diagram illustrating a screen operation when a specified date is selected by tapping or the like on the calendar view.

Further, when the specified date is selected on the calendar view by tapping, as shown in FIG. 8, the column of the date is magnified, and the icon of the contents is displayed on a magnified scale. Therefore, the user easily confirms the details of the contents. As the reaction to the magnification of the selected column, peripheral columns are reduced. As a result, the contents icons of the peripheral columns are simply displayed on reduced scales as dots for indicating the presence of data.

Figure 9:
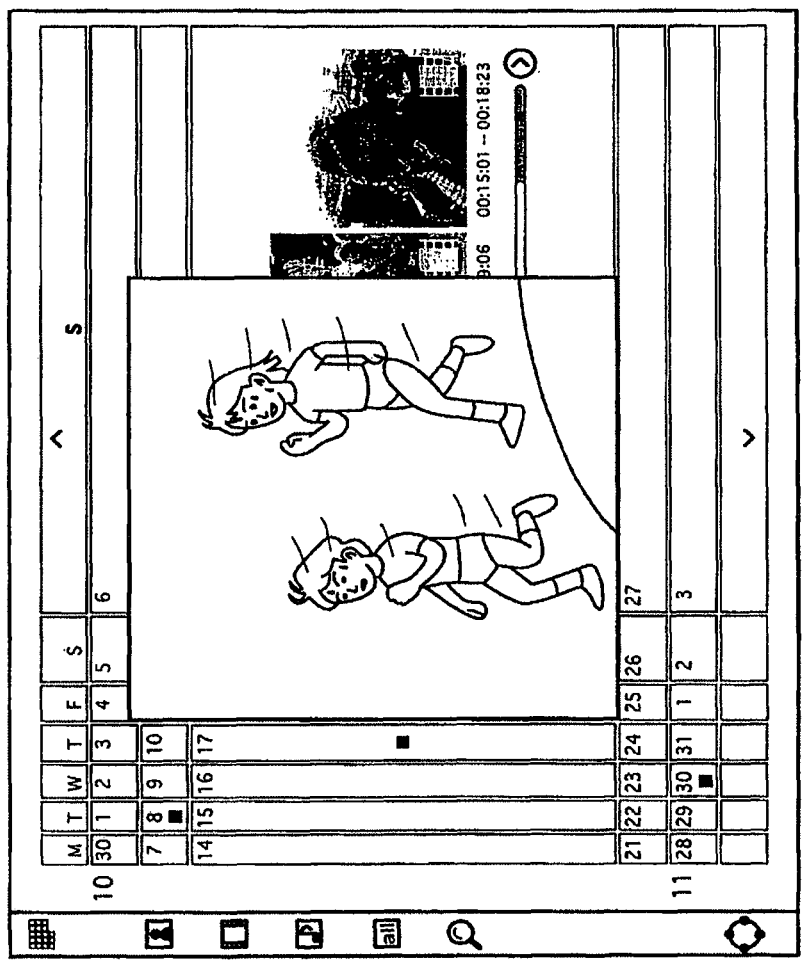
FIG. 9 is a diagram showing a mode in which a motion picture starts to be reproduced in response to tapping of a representative frame.

As shown in FIG. 8, the screen in which only the assigned column of the specified date is displayed on a magnified scale is referred to as 'fisheye view'. In the example shown in FIG. 8, the date column of October 17 with the motion picture contents mapped thereon is displayed in the fisheye view. In the normal calendar view screen shown in FIG. 7, a single representative frame is displayed for the contents, but, on the fisheye view, for example, plural representative frames extracted for the scene switching are disposed in time series. Further, in the fisheye view, a time slider is prepared, and, by moving the slider, the representative frame can be forwarded in a time direction. Then, the representative frame is tapped, and the motion picture starts to be reproduced at that point of time (see FIG. 9).

Figure 10:
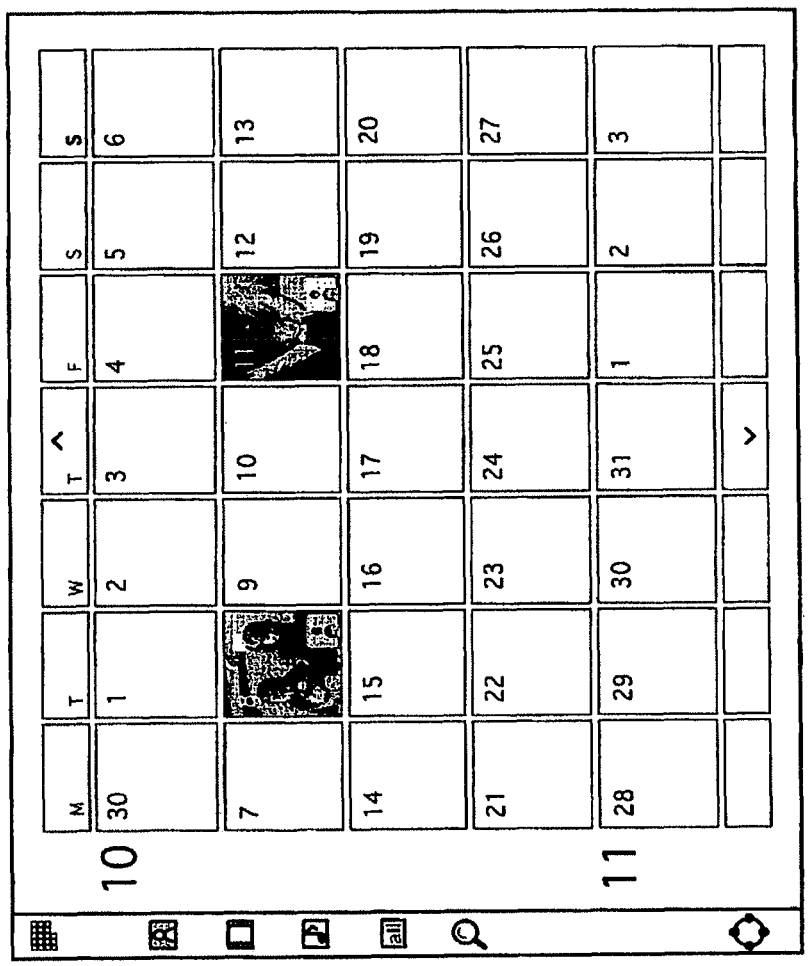
FIG. 10 is a diagram showing a mode in which, if a still picture button is pressed on a tool bar, only still picture contents are filtered, and only icons of the still picture contents are displayed.

In the calendar view shown in FIG. 7, the contents searched with no limitation of the media kind are mapped on the individual date columns, but the media kind may be limited through the tool bar. For example, if the still picture button is pressed on the tool bar, only the still picture contents are filtered, and, as shown in FIG. 10, only the icons of the still picture contents are displayed.

In the present embodiment, as the screen format serving as the optimal viewing style for the contents, plural view styles, such as 'calendar view', 'map view', 'list view', 'matrix view', 'shelf view', and the like, are prepared.

The view style can be selected from the view style menu bar (see FIG. 6) appearing when the view style button on the top of the tool bar is pressed. The view style can be switched after the view style is assigned and the contents view is displayed, as well as when the contents manager starts.

However, when the view style is switched, the context succeeds such that the contents appearing in the previous view region can be visualized in the next view region. The context succession can be implemented by raising a priority of the previous state (search condition) and by performing the contents search.

Figure 11:
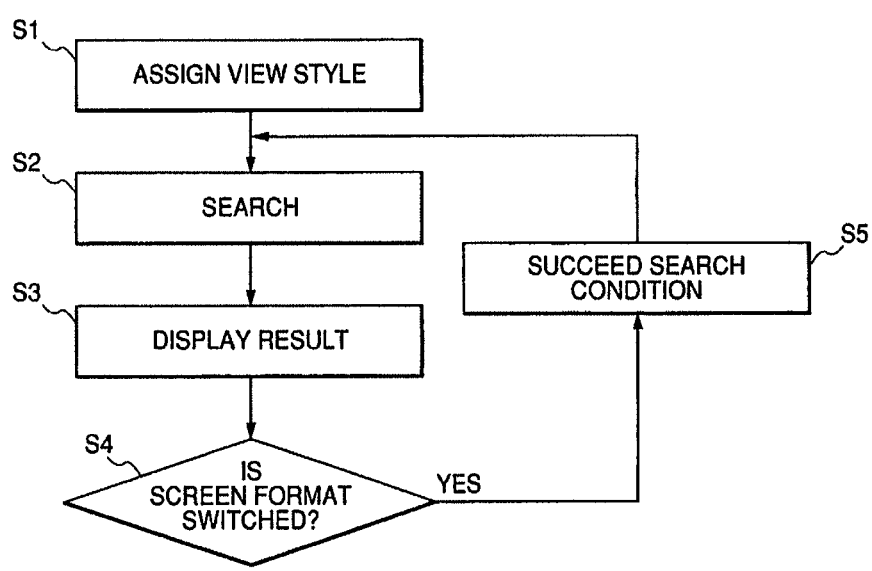
FIG. 11 is a flowchart showing a process sequence when a view style is switched.

FIG. 11 is a flowchart showing a process sequence when the view style is switched.

For example, if the view style is assigned through the view style button of the tool bar (Step S1), the contents providing space is searched according to the assigned search condition, such as the media kind or the like (Step S2).

Then, the information (the representative frame or the like) of the individual contents extracted through the search is mapped on the screen format of the assigned view style and is displayed on the view region (Step S3). The user can visually understand and easily find out the desired contents on the view region. Then, through the view region, the contents can be utilized, for example, reproduced or copied.

If switching of the view style is performed through the view style button of the tool bar (Step S4), the contents succeeds, for example, the priority of the previous state (search condition) is raised (Step S5), and the process returns to the step S2. Then, the restructure of the contents and display of the contents view in a new view style are repeatedly performed.

C-3. Map View

The map view is a viewing style in which the contents are divided and arranged according to geographical information, such as a world map, a Japan map, or the like, to be presented, and the individual contents are mapped at associated places on the map or its peripheries. The associated place is a place at which the contents is produced, edited, updated, or copied or a place for representing (concerning) the details of the contents. Further, as the icon of the contents, for example, the representative frame extracted from the motion picture contents or the jacket of the DVD title can be used. According to the map view, the user can easily reach the desired contents, in particular, with the attribute of "Where" of 5W1H as the clue.

Figure 12:
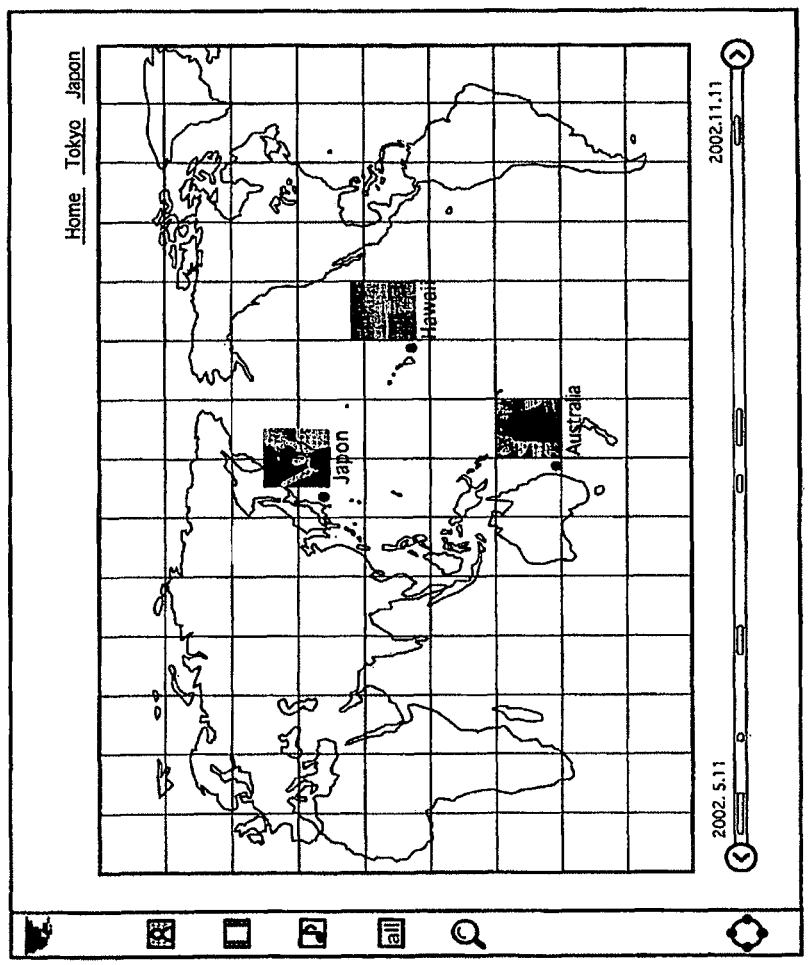
FIG. 12 is a diagram showing an example of a configuration of a contents view screen in which a map view is selected as a screen format.

FIG. 12 shows an example of the configuration of the contents view screen in which the map view is selected as the screen format. In the example shown in FIG. 12, the map view has the screen format on the basis of the world map, and, the icons of the contents, each having the geographical information as the attribute, are mapped at three points of Japan, Australia, and Hawaii.

Further, in the example shown in FIG. 12, at a lower stage of the view region, a bar-shaped date scroll bar for assigning the period of the contents appearing on the map view is provided. On the date scroll bar, the point of time corresponding to date information of the contents, such as the captured date of a photograph or the like, is displayed.

Figure 13:
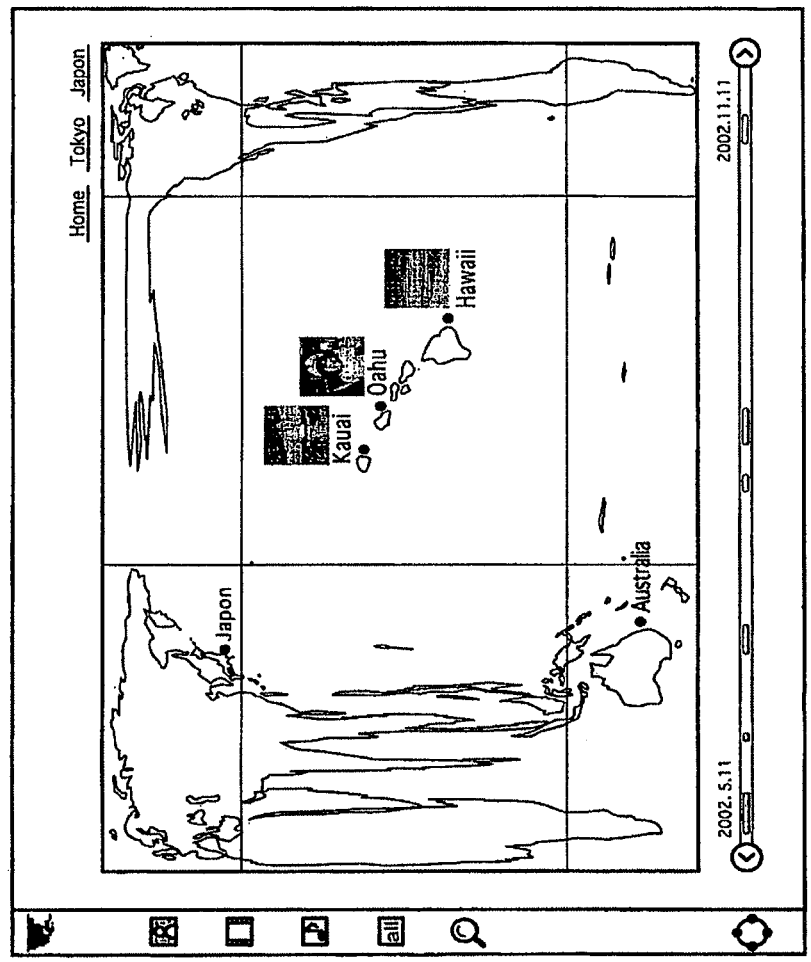
FIG. 13 is a diagram showing a mode in which a selected pedestal is being magnified on the map view.

The map view on the basis of the world map has a plurality of cells divided for every predetermined latitude and longitude. Each cell functions as 'pedestal' of an album on which the contents associated with the corresponding point is shown. If any pedestal is selected by tapping, as shown in FIG. 13, the pedestal is magnified, and simultaneously the icon mounted on the pedestal is displayed on a magnified scale. Therefore, the user easily confirms the details of the contents. As the reaction to the magnification of the selected pedestal, peripheral pedestals are reduced. As a result, the contents icon of the peripheral pedestals is displayed on reduced scales as dots for indicating the presence of data.

Figure 14:
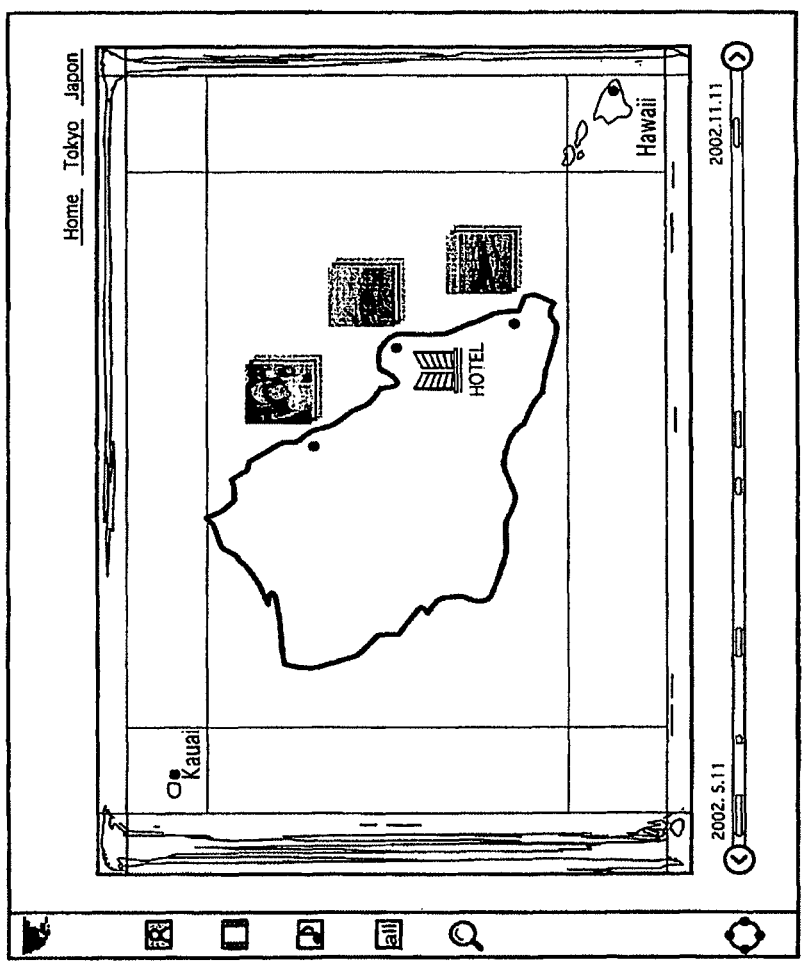
FIG. 14 is a diagram showing a mode in which another selected pedestal is being magnified on the map view.
Figure 15:
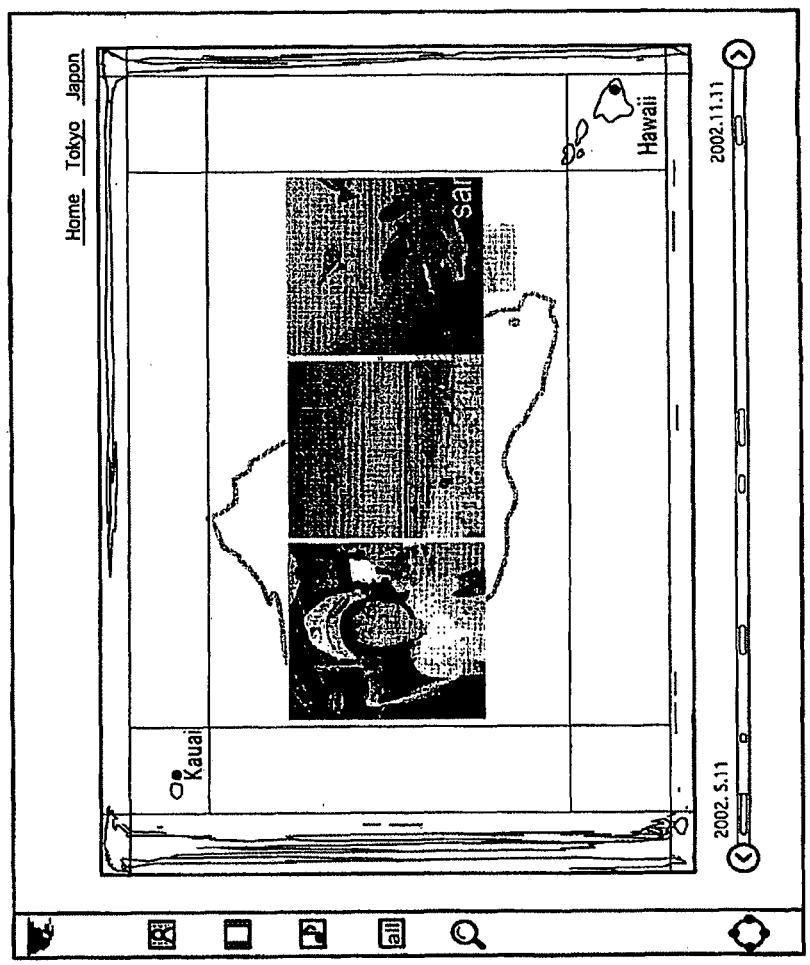
FIG. 15 is a diagram showing a mode in which another selected pedestal is being magnified on the map view.

If the pedestal is further tapped, the pedestal is further magnified, and the icon mounted on the pedestal is displayed on a magnified scale. Such a magnification operation of the pedestal is performed at multi stages. For example, when the contents has plural groups of still pictures, as shown in FIG. 14, if the pedestal is magnified to some extent, several image frames are displayed to be stacked so as to present that the contents has groups of still pictures. Then, if a specified group of still pictures is selected by tapping, as shown in FIG. 15, the individual still pictures of the selected picture are developed on the pedestal.

Further, in the map view, a specified pedestal is registered as a home so as to be used for short cut. The upper right of the map view shown in FIG. 12 shows that 'Tokyo Japan' is registered as the home. The short cut to the pedestal of the home is prepared, and thus the user can rapidly reach a frequently used contents search screen.

C-4. Matrix View

In the calendar view or the map view, the valid clue or guide for allowing the user to find out the desired contents is provided, in which 'When' or 'Where' of 5W1H is handled as the contents attribute, and the contents view, which visually uses the information, such as the date or place, is presented. In this case, however, since the icon of the contents is not disposed at the date column or place (pedestal) which does not have the corresponding contents, there is a problem in that a dead space on the screen is increased. At the date column or the place on the map which has a number of contents, plural reduced icons are disposed densely, and thus it is difficult for the user to view the contents.

The matrix view is a view style to solve the problem. In the matrix view, the icons of the contents are orderly arranged on the screen in a lattice shape. Therefore, a larger number of icons can be presented on the screen, and the dead space on the screen can be narrowed. For example, when enormous still pictures are managed, the matrix view presents the contents such that the contents can be easily searched with only display of thumbnails.

Figure 16:
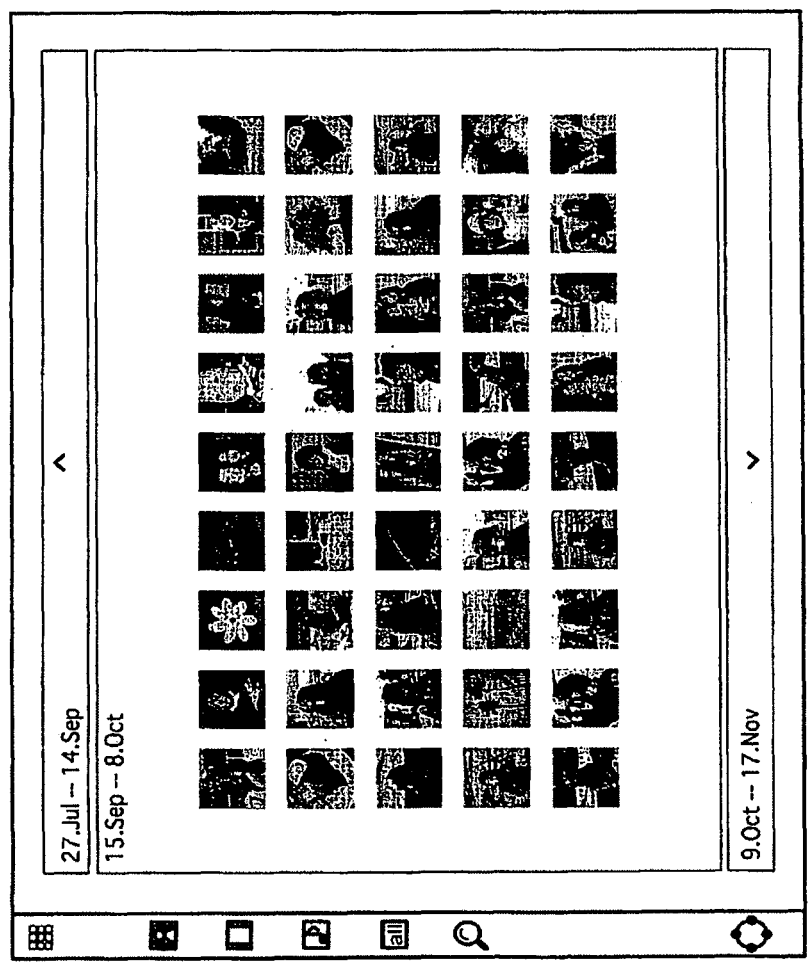
FIG. 16 is a diagram showing an example of a screen configuration of a matrix view.

FIG. 16 shows an example of the screen configuration of the matrix view. In the example shown in FIG. 16, the still picture is selected on the tool bar, the thumbnails of the still picture contents, such as photographs or the like, are sorted in sequence of captured date and arranged in a lattice shape along the time axis. On one page of the matrix view, the maximum thumbnails to be mounted are displayed.

In the example shown in FIG. 16, at upper and lower ends of the matrix view, scroll buttons in forms of arrows are provided, and, with the operations of the scroll buttons, the matrix view can be switched to the front or rear page on the time axis.

Figure 17:
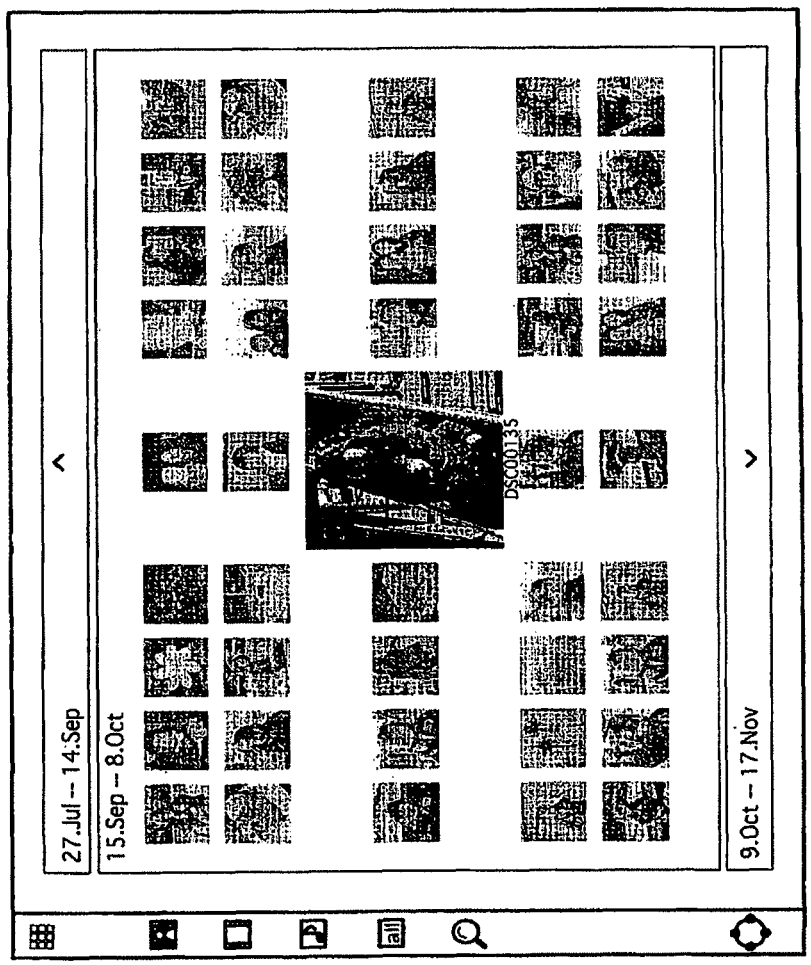
FIG. 17 is a diagram illustrating an operation of a screen when a specified thumbnail is selected on the matrix view.

On the matrix view, if a specified thumbnail is selected by tapping, as shown in FIG. 17, the thumbnail is magnified (or has an original image size). Accordingly, peripheral thumbnails are displayed in gray, and the selected contents can be highlighted.

C-5. List View

In the calendar view or the map view, the valid clue or guide for allowing the user to find out the desired contents is provided, in which 'When' or 'Where' of 5W1H is handled as the contents attribute, and the contents view, which visually uses the information, such as the date or place, is presented. According to such a view style, the user can find out interesting contents with 5W1H as the clue while viewing the contents icons mapped on the calendar or the map, regardless of the media kind, such as motion picture, still picture, musical piece, or the like.

On the other hand, like a movie, there is a case in which attribute information, such as the contents title or the like, is used as the clue for finding out the contents by the user, instead of 5W1H. A list-view has a list-type view style in which the contents title, as well as the representative frame, is introduced.

Figure 18:
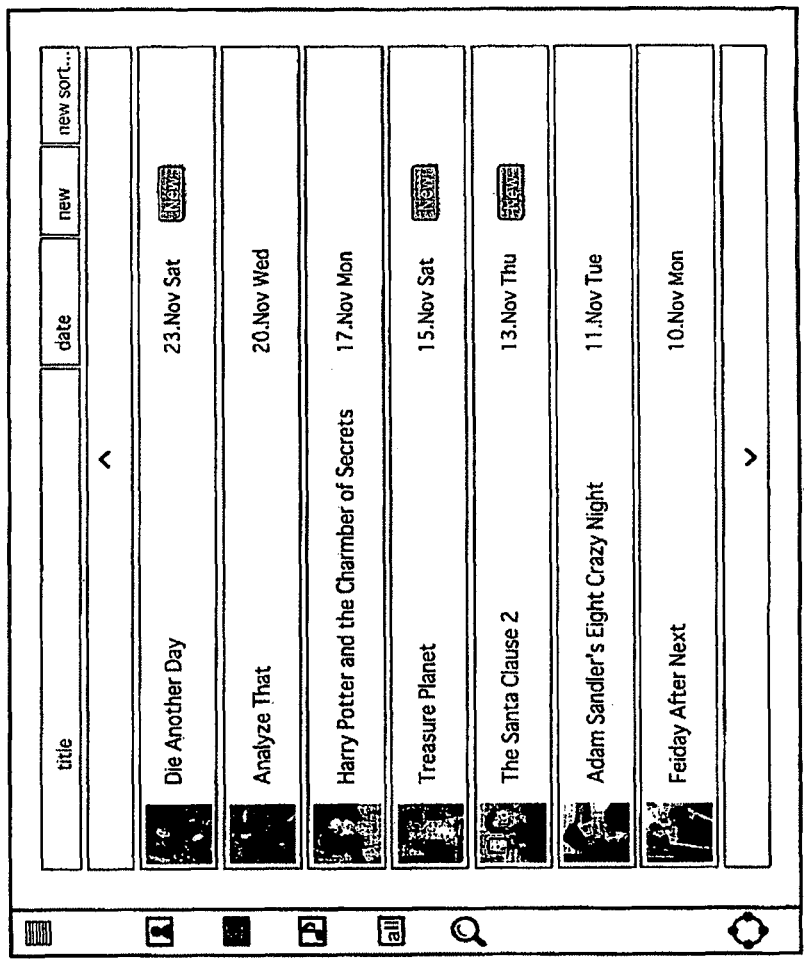

If the list is selected on the view style selection menu, and the motion picture is selected as the media kind, the list view for the motion picture contents extracted on the contents providing space is presented. FIG. 18 shows an example of the screen configuration of the list view, which introduces the motion picture contents, such as the movie or the like. In the example shown in FIG. 18, For example, banners are correspondingly provided for the motion picture contents, and, in each banner, the representative frame, the title, the date of the motion picture contents, and the like are displayed. Further, in case of a new movie, a mark of "New" is attached so as to call a user's attention.

The banners are sorted, for example, in sequence of date, but the invention is not limited to this configuration. For example, the banners may be sorted in alphabetical order or according to other rules.

On one page of the list view, the maximum banners to be mounted are displayed. In the example shown in FIG. 18, at upper and lower ends of the list view, scroll buttons in forms of arrows are provided. With the operations of these buttons, the list view can be switched to the front or rear page.

Figure 19:
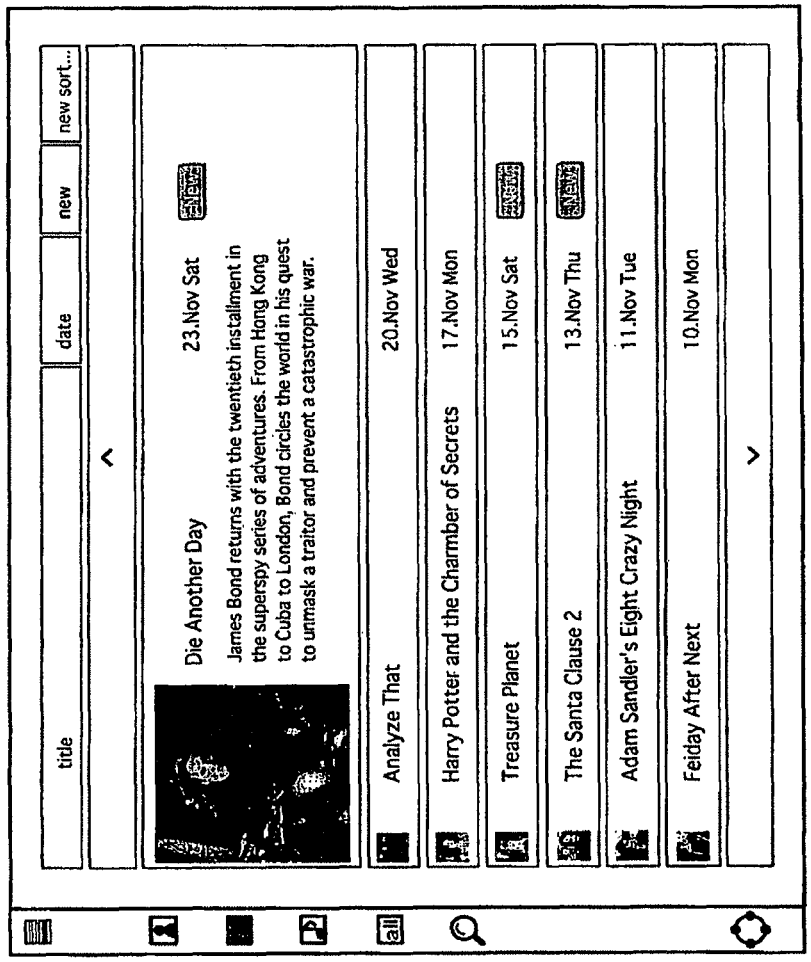
FIG. 19 is a diagram illustrating an operation when a specified banner is selected on the list view.

If a specified banner is selected on the list view by tapping, as shown in FIG. 19, the banner is magnified. Accordingly, other banners in the same page are reduced, and thus the selected contents can be highlighted.

Further, on the magnified banner, detailed information, such as the outline of the movie, a producer name, or the like, is displayed. The user can reconfirm the contents on the basis of such information before reproducing (buying) the contents. In this state, if the banner is further tapped, a process for utilizing the contents, such as reproduction or copy, or a process for buying the contents starts.

C-6. Shelf View

In the calendar view or the map view, the contents view, which visually uses the information, such as the date or place, can be presented, and, for the user who searches the contents with no guide, the valid clue or guide for allowing the user to find out the desired contents can be provided on the base of 5W1H.

On the other hand, for the user which has already completed some contents search working, the search condition which was used for the contents search can be a valid clue or guide at the time of allowing the user to search the subsequent contents.

A shelf view is a viewing style in which the search condition assigned by the user is allocated for each shelf. That is, in each shelf, a metaphor is used that a group of contents extracted from the contents providing space on the basis of the search condition are stored. Each shelf has reference information for the contents extracted on the basis of the registered search condition (that is, virtually stored in the shelf). In addition, whenever the shelf opens, the search of the contents providing space is performed according to the search condition, and thus the reference information for the contents is updated.

Figure 20:
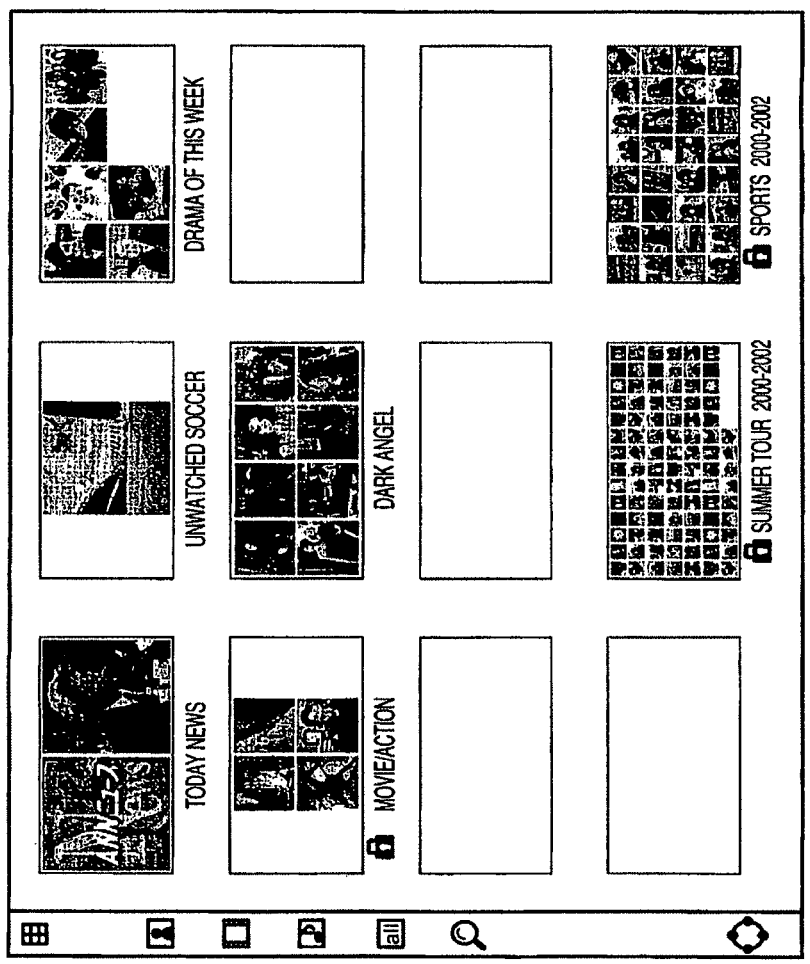
FIG. 20 is a diagram showing an example of a screen configuration of a shelf view.

FIG. 20 shows an example of the screen configuration of the shelf view. In the example shown in FIG. 20, the representative frames of the contents virtually stored in the individual shelves (that is, extracted on the basis of the registered search condition) are mapped on front surfaces of the shelves. In the example shown in FIG. 20, the shelves having the titles of 'TODAY NEWS', 'UNWATCHED SOCCER', 'DRAMA OF THIS WEEK', 'MOVIE/ACTION', 'DARK ANGEL', 'SUMMER TOUR 2000-2002', and 'SPORTS 2000-2002' are registered. Further, for each shelf, the search condition for searching the contents corresponding to the title or the reference information to the contents associated with the shelf is provided.

When the shelf opens, the search process of the contents according to the search condition starts, but, when the update of the shelf is not desired, the search process can be locked. In the example shown in FIG. 20, an icon in a shape of a lock is attached to the 'MOVIE/ACTION' shelf, it indicates that the search process is locked.

Figure 21:
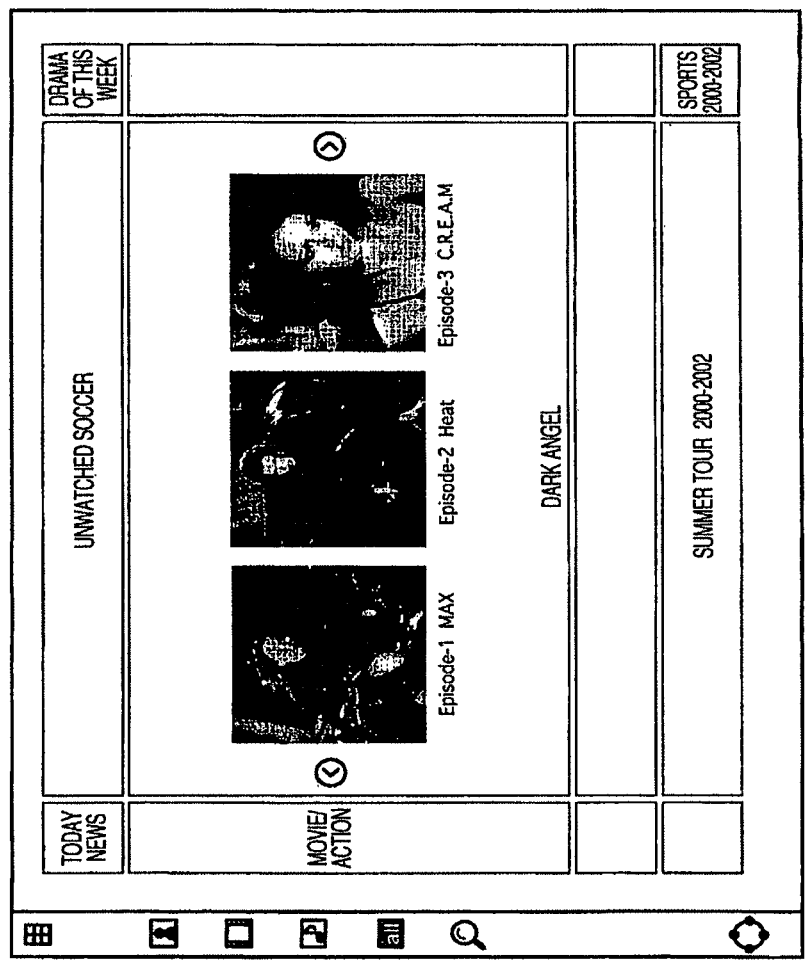
FIG. 21 is a diagram illustrating an operation when a desired shelf is selected.

If a desired shelf is selected by tapping, as shown in FIG. 21, the shelf is magnified. Accordingly, other shelves are displayed on reduced scales, and thus the selected shelf can be highlighted. Further, since the representative frame of the contents mapped on the front surface is magnified, the user can observe more closely the selected shelf and acquire the clue for the contents selection. As described above, with the selection of the shelf, the search process of the contents starts, but the search can be locked.

In the state shown in FIG. 21, if the representative frame in the shelf is further tapped, the process for utilizing the corresponding contents, such as reproduction or copy, or the process for buying the contents starts.

Next, a process sequence for registering the search condition in the shelf will be described.

If a blank shelf is assigned on the shelf view by tapping, a registration process of that shelf progresses. In this case, an operation window for registration is popped-up, and registration working of the shelf is performed in a wizard manner.

Figure 22:
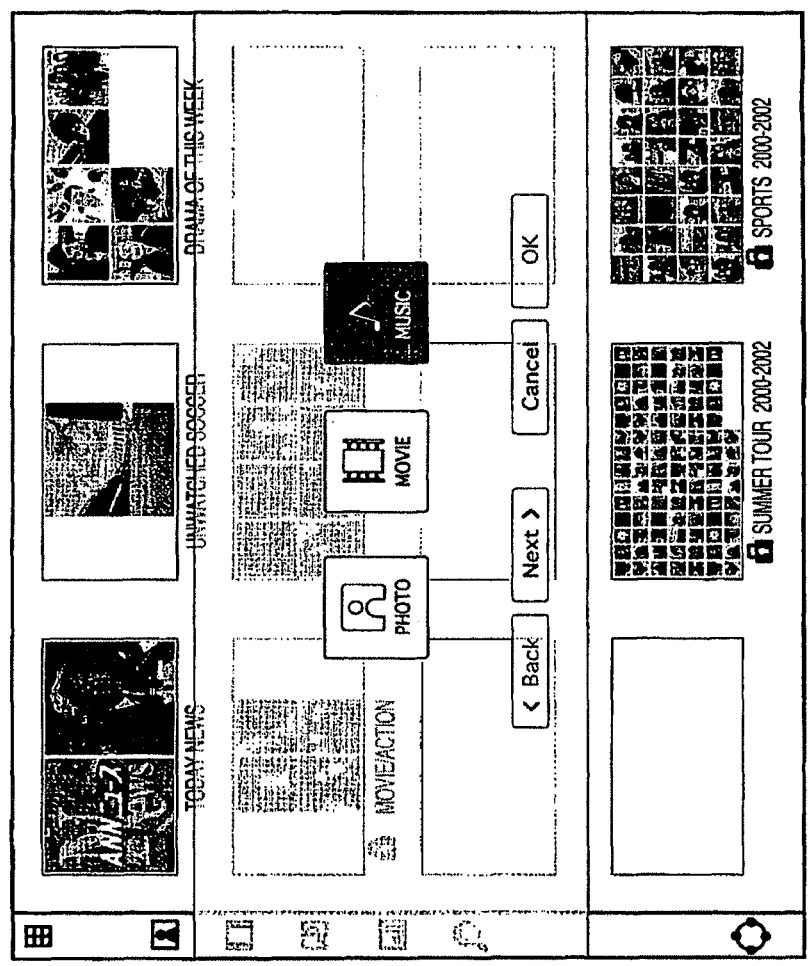
FIG. 22 is a diagram illustrating an operation sequence for registering a shelf search condition.
Figure 23:
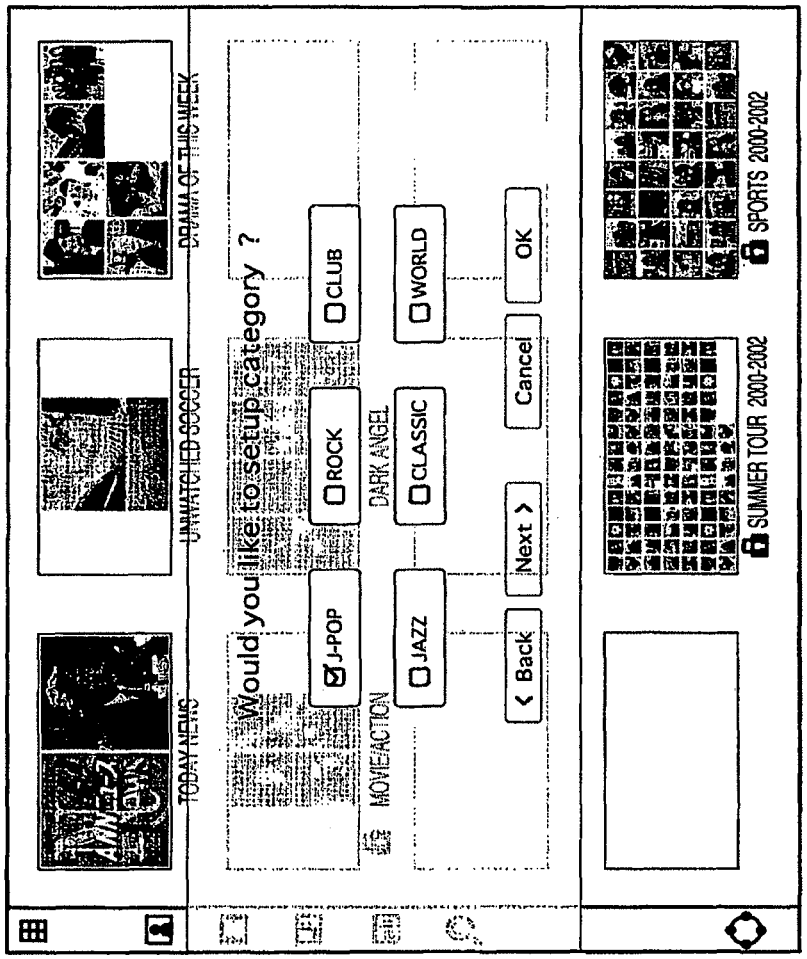
FIG. 23 is a diagram illustrating an operation sequence for registering a shelf search condition.

As the first step of the shelf registration wizard, as shown in FIG. 22, the media kind to be handled by the shelf is set. In the example shown in FIG. 22, a mode is shown in which MUSIC is selected as the media kind. Subsequently, as shown in FIG. 23, a wizard for setting a category of MUSIC is presented. In the example shown in FIG. 23, a mode is shown in which J-POP is selected as the category.

Moreover, in the music shelf, search items to be assigned as the search condition, or the sequence of the wizard is not limited. Further, at the time of other media kinds, such as motion picture or still picture, of course, a setting sequence of a search condition, other than the above-described sequence, is used.

Figure 24:
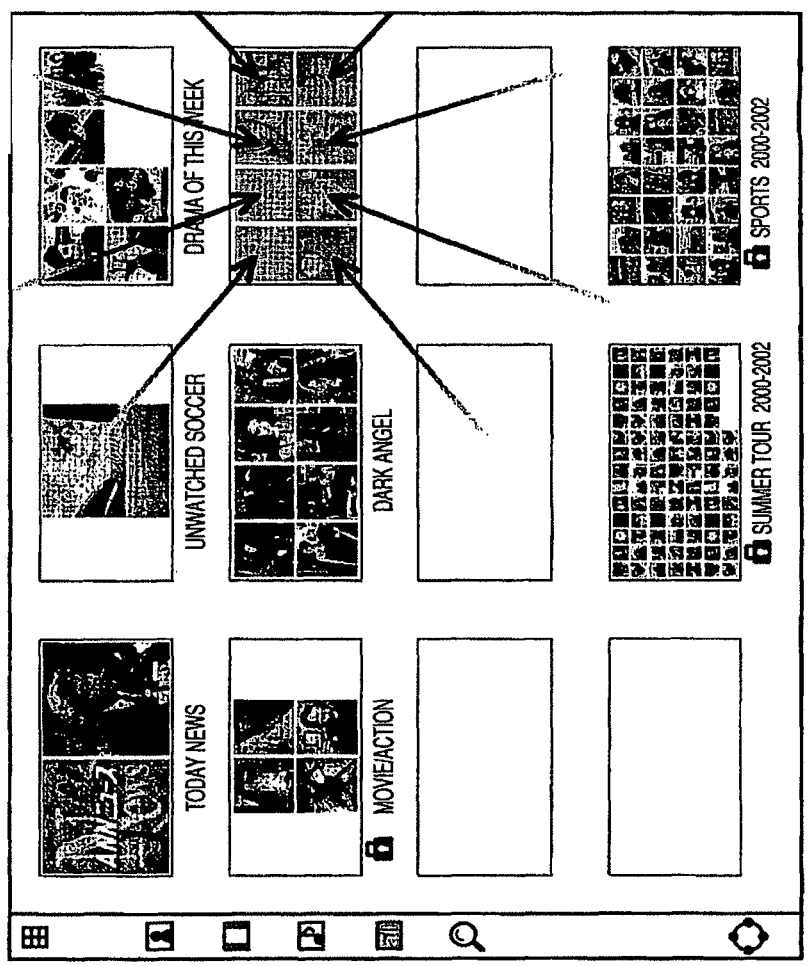
FIG. 24 is a diagram illustrating an operation sequence for registering a shelf search condition.

Then, if setting of the search condition of the shelf ends, the contents providing space is searched according to the search condition. Then, if the corresponding contents are extracted, as shown in FIG. 24, the representative frames thereof are mapped on the front surface of the newly registered shelf, and then the registration process ends.

C-7. Display of Home Network

As described above with reference to FIG. 1, on the home network, in addition to the home server which collectively performs the contents providing service, the unspecified apparatuses, such as the PC or PDA, the camcorder, the digital camera, the TV receiver, the DVD recorder, the HD recorder, and the like, are connected. These apparatuses on the home network may operate as the remote disks constituting the contents providing space or as the target devices for reproducing or copying the contents for the contents management system.

If the home network display button (see FIG. 6) on the tool bar is pressed, the contents access control unit 103 refers to the contents providing space 104 and specifies accessible devices in the same home network. At that time, it is also examined whether the found device can be the source of the contents or the sink of the contents.

Figure 25:
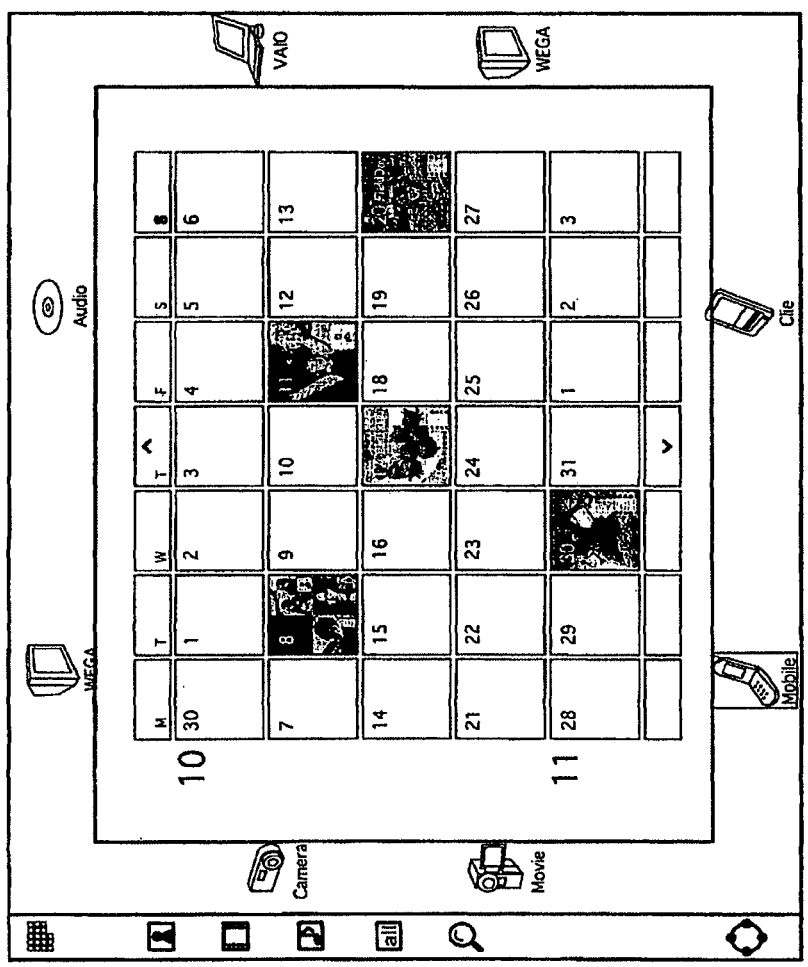
FIG. 25 is a diagram illustrating an example of a screen configuration which displays a home network.

Then, all the apparatuses detected on the home network are visualized on the view region, as shown in FIG. 25. In the example shown in FIG. 25, in the periphery of the calendar view, the individual apparatuses detected on the home network are disposed. The user can directly assign the apparatus, which is the source of the storage place of the contents or the target of contents reproduction or contents movement, through the screen on the home network display of the view region.

In response to the assignment operation of the apparatus on the home network display, the contents acquiring unit 108 reads out the assigned contents from the contents providing space 104 through the contents access control unit 103 and delivers the read contents to the contents utilizing unit 109. The contents utilizing unit 109 utilizes the contents acquired by the contents acquiring unit 108, for example, reproduces the media contents, such as the motion picture, sound, or the like, or copies the contents.

It should be understood by those skilled in the art that various modifications, combinations, sub-combinations and alternations may occur depending on design requirements and other factors insofar as they are within the scope of the appended claims or the equivalents thereof.

What is claimed is:

1. A non-transitory computer-readable storage medium storing a contents management system configured to, when executed, cause a processor to manage multiple contents stored in one or more apparatuses, the contents management system comprising:
   a command input unit configured to receive, using the processor, a search condition and a viewing style for guiding a user to desired contents, in which the search condition is selected from a number of search conditions and the viewing style is selected from a number of viewing styles;
   a screen format generating unit configured to generate, using the processor, a screen format according to the selected viewing style from the command input unit;
   a contents search unit configured to acquire, using the processor, contents from the one or more apparatuses according to the selected search condition; and
   a contents presenting unit configured to cause, using the processor, at least part of the acquired contents to be displayed on a screen in the format generated by the screen format generating unit,
   the number of viewing styles includes (i) a map view wherein the screen format associated therewith is based on a map of a geographical area with time information provided therewith, such that when the map view is the selected viewing style the at least part of the acquired contents are represented on the map according to one or more geographical locations and the time information associated with the at least part of the acquired contents is provided on the screen, and (ii) a calendar view wherein the screen format associated therewith generated by the screen format generating unit is a calendar divided up into multiple areas, each area representing a respective day, and
   the command input unit is further configured to receive a switch viewing style command in which a currently selected one of the map view or the calendar view is changed to the other one of the map view or the calendar view wherein a current screen format is caused to be changed accordingly.

2. The non-transitory computer-readable storage medium storing a system according to claim 1, wherein the content search unit acquires the contents based on the time information associated with the contents.

3. The non-transitory computer-readable storage medium storing a system according to claim 1, wherein the contents presenting unit displays and maps onto one or more of the areas of the calendar one or more icons representing at least part of the acquired contents.

4. A processor-implemented contents management method for managing multiple contents stored in one or more apparatuses, the contents management method comprising:
   receiving, via a processor, a selected search condition and a selected viewing style for guiding a user to desired contents, in which the search condition is selected from a number of search conditions and the viewing style is selected from a number of viewing styles;
   generating, via the processor, a screen format according to the selected viewing style;
   acquiring, via the processor, contents from the one or more apparatuses according to the search conditions; and
   displaying the at least part of the acquired contents on a screen in the screen format,
   the number of viewing styles includes (i) a map view wherein the screen format associated therewith is based on a map of a geographical area with time information provided therewith, such that when the map view is the selected viewing style the at least part of the acquired contents are represented on the map according to one or more geographical locations and the time information associated with the at least part of the acquired contents is provided on the screen, and (ii) a calendar view wherein the screen format associated therewith is a calendar divided up into multiple areas, each area representing a respective day, and
   the contents management method further comprising receiving a switch viewing style command in which a currently selected one of the map view or the calendar view is changed to the other one of the map view or the calendar view wherein a current screen format is caused to be changed accordingly.

5. The method according to claim 4, wherein the contents are acquired based on the time information associated with the contents.

6. The method according to claim 4, wherein displaying at least part of the acquired contents on a screen in the screen format further comprises displaying and mapping onto one or more of the areas of the calendar one or more icons representing at least part of the acquired contents.

7. A contents management system configured to manage multiple contents stored in one or more apparatuses, the contents management system comprising:
   a processor configured to:
      receive, via a command input unit, a selected search condition, and a selected viewing style for guiding a user to desired contents, in which the search condition is selected from a number of search conditions and the viewing style is selected from a number of viewing styles;
      generate, via a screen format generating unit, a screen format according to the selected viewing style from the command input unit; and
      acquire, via a contents search unit, contents from the one or more apparatuses according to the search conditions; and
   a display device configured to display, via a display unit, at least part of the acquired contents on a screen in the format generated by the screen format generating unit,
   the number of viewing styles includes a map view wherein the screen format associated therewith is based on a map of a geographical area with time information provided therewith, such that when the map view is the selected viewing style the at least part of the acquired contents are represented on the map according to one or more geographical locations and the time information associated with the at least part of the acquired contents is provided on the screen, and (ii) a calendar view wherein the screen format associated therewith generated by the screen format generating unit is a calendar divided up into multiple areas, each area representing a respective day, and the processor is further configured to receive, by way of the command input unit, a switch viewing style command in which a currently selected one of the map view or the calendar view is changed to the other one of the map view or the calendar view wherein a current screen format is caused to be changed accordingly.

8. The contents management system according to claim 7, wherein the contents are acquired based on the time information associated with the contents.

9. The contents management system according to claim 7, wherein the contents presenting unit displays and maps onto one or more of the areas of the calendar one or more icons representing at least part of the acquired contents.

* * * * *